(12) United States Patent
Mosimann et al.

(10) Patent No.: US 9,053,176 B2
(45) Date of Patent: Jun. 9, 2015

(54) SEMANTICALLY GUIDED REPORT DESIGN

(75) Inventors: David Mosimann, New Westminster (CA); Marko Udovicic, Burnaby (CA); Wuzhen Xiong, Shanghai (CN); Philipp Ziegler, Vancouver (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 1166 days.

(21) Appl. No.: 12/967,231

(22) Filed: Dec. 14, 2010

(65) Prior Publication Data

US 2012/0131042 A1    May 24, 2012

(30) Foreign Application Priority Data

Nov. 24, 2010   (CN) .......................... 2010 1 0556986

(51) Int. Cl.
*G06F 17/30* (2006.01)
*G06Q 10/10* (2012.01)

(52) U.S. Cl.
CPC .......... *G06F 17/30643* (2013.01); *G06Q 10/10* (2013.01)

(58) Field of Classification Search
CPC .. G06F 17/30; G06F 17/246; G06F 17/30643
USPC .......................................... 715/246, 212, 219
See application file for complete search history.

(56) References Cited

U.S. PATENT DOCUMENTS

| | | | |
|---|---|---|---|
| 5,555,403 A | 9/1996 | Cambot et al. | |
| 5,603,021 A * | 2/1997 | Spencer et al. | 1/1 |
| 7,181,435 B2 | 2/2007 | Cambot et al. | |
| 8,359,308 B2* | 1/2013 | Hays et al. | 707/714 |
| 2003/0115207 A1* | 6/2003 | Bowman et al. | 707/100 |
| 2006/0107196 A1* | 5/2006 | Thanu et al. | 715/503 |
| 2010/0191718 A1* | 7/2010 | Coriell et al. | 707/714 |
| 2012/0066267 A1* | 3/2012 | Hays et al. | 707/803 |

* cited by examiner

*Primary Examiner* — Scott Baderman
*Assistant Examiner* — Seung Jung

(57) ABSTRACT

Various embodiments of systems and methods for providing a set of placement options to a user when a new report object is requested to be placed in an area of the report are described herein. One or more existing report objects are associated with the area of the report. The set of placement options are determined based on at least one of the following: area type of the area in which the new report object is requested to be placed and a semantic relationship between the new report object and the one or more existing report objects. In one embodiment, the area of the report includes a sub-area. The set of placement options for a sub-area is determined based on the semantic relationship of new report objects and the existing report objects associated with the area and the sub-area.

15 Claims, 23 Drawing Sheets

SEMANTICALLY GUIDED REPORT DESIGN

This application claims priority under 35 U.S.C. §119 to Chinese Patent Application 201010556986.2, filed on Nov. 24, 2010, titled "SEMANTICALLY GUIDED REPORT DESIGN", which is incorporated herein by reference in its entirety.

FIELD

Embodiments generally relate to computer systems, and more particularly to methods and systems for providing a set of placement options for placing a new report object in an area of a report.

BACKGROUND

Business intelligence (BI) applications such as Crystal Reports® by SAP® provide a flexible platform for a user to create reports in real time. These tools allow a user to include new report objects in any area of the report. This allows the user to change the report according to their requirements.

A report includes one or more areas, the one or more areas may contain one or more existing report objects. At present, when a report designer places a new report object in any of the one or more areas, the report designer is not aware whether this addition would maintain the semantic validity of report rendering. Specifically, the report designer find it difficult to understand whether the combination of the new report object and the one or more report objects present in the same area of the report would preserve the validity of rendering.

Therefore a method that provides the user a set of semantically correct placement options when the user tries to place the new report object in an area of the report is desired. This would ensure semantically correct report rendering.

SUMMARY

Various embodiments of systems and methods for providing a set of placement options when a new report object is requested to be placed in an area of a report are described herein. A request is received to place the new report object in the area of the report. A set of placement options are determined based on at least one of the following: an area type, and the semantic relationship between the new report object and one or more existing report objects associated with the area. The area type of the area is one of an iterative type and a static type. The set of placement options are provided based on the determination.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for providing a semantically guided report design are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
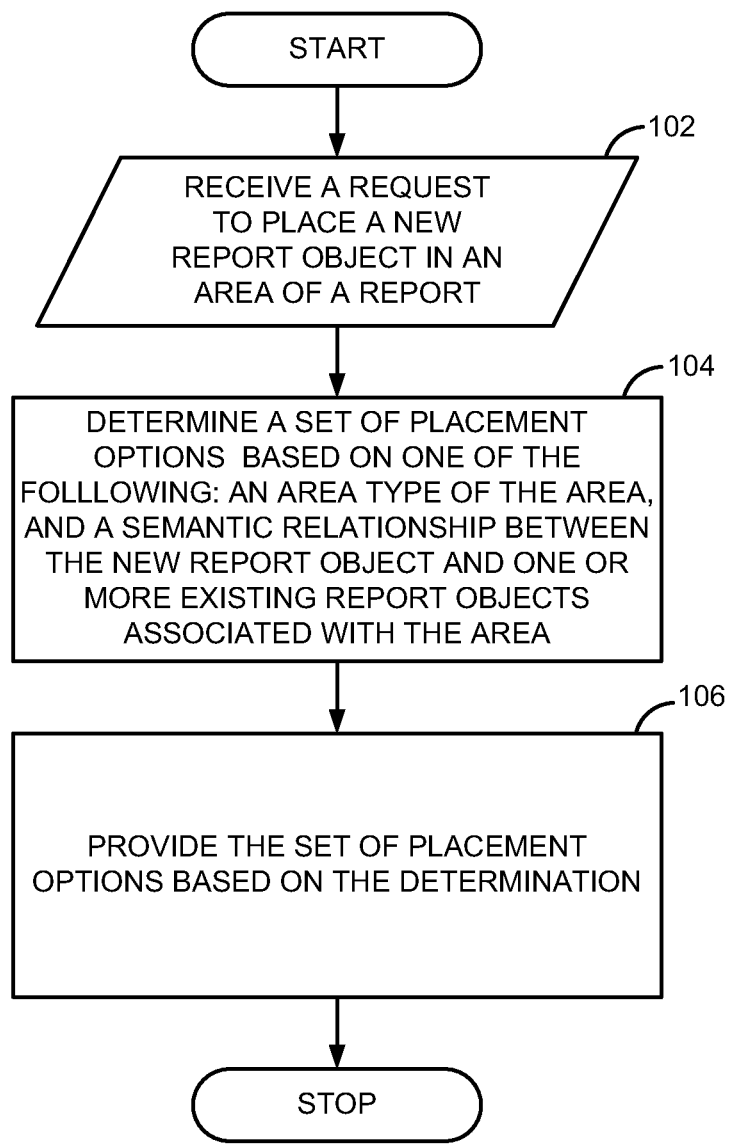
FIG. 1 is a flow diagram illustrating a method for providing a set of placement options when a new report object is requested to be placed in an area of a report, according to an embodiment.

FIG. 1 is a flow diagram illustrating a method for providing a set of placement options when a new report object is requested to be placed in an area of a report, according to an embodiment. A report may have one or more areas. One or more existing report objects may be associated with each area of the report. In one embodiment, the one or more areas of the report may include one or more sub-areas present within the area of the report. One or more existing report objects may be associated with the one or more sub-areas of the report. In one embodiment, the report is a business intelligence (BI) application such as a Crystal Report® or SAP® BusinessObjects™ Web Intelligence®.

Initially at block 102, a request is received to place the new report object in an area of the report. In one exemplary embodiment, the request is received from a user. In one embodiment, the request is received through a user interface. In one embodiment, the request is received to place the new report object in a sub-area present within an area of the report. Each of the one or more existing report objects and the new report object may contain one or more data elements.

Next at block 104, a set of placement options are determined. In one embodiment, the set of placement options are determined based on at least one of the following: an area type, and semantic relationship between the new report object and the one or more existing report objects associated with the area in which the new report object is requested to be placed.

In one embodiment, when the new report object is requested to be placed in a sub-area present within an area, the set of placement options are determined based on the area (sub-area) type and the semantic relationship between the new report object and the one or more existing report objects associated with the sub-area and the one or more existing report objects associated with the area in which the sub-area is placed.

The area type may be either an iterative type or a static type. In one embodiment, the area that has the area type as static is rendered by rendering the data elements associated with the report objects (existing or new) associated with the area. In one embodiment, the area that has the area type as the iterative type are rendered by sequentially rendering the data elements contained in the report objects (existing or new) associated with the area.

The semantic relationship is either a one-to-one relationship or a one-to-many relationship. In a one-to-one relationship one entity is associated to one other entity. In a one-to-many relationship one entity is associated with a potential plurality of other entities. In one embodiment, the semantic relationship is a one-to-one relationship when each data element of a new or existing report object corresponds to only a single data element of another existing or new report object. In one embodiment, the semantic relationship is a one-to-many relationship when each data element of a new or existing report object corresponds to more than one data element of another existing or new report object.

In one embodiment, the semantic relationship may be a direct relationship or a transitive relationship. A direct relationship exists between two existing report objects or between a new report object and an existing report object when each data element of an existing report object or a new report object has a direct (one-to-one or one-to-many) relationship with the one or more data elements of another existing report object or new report object. A transitive relationship exists between two report objects when each data element of an existing report object or a new report object does not have a direct relationship, but has a relationship, with the one or more data elements of another existing or new report object.

Finally, the set of placement options determined in block 104 are provided in block 106. In one embodiment, the set of placement options are provided to a user. In one embodiment, the set of placement options provide semantic guidance for placing the new report object in the area of the report. In one embodiment, one of the placement options from the set of placement options is selected by a user. In one embodiment, one of the placement options from the set of placement options is selected automatically. In one embodiment, the set of placement options are provided on a user interface through which a user can select one of the placement options from the set of placement options.

Figure 2:
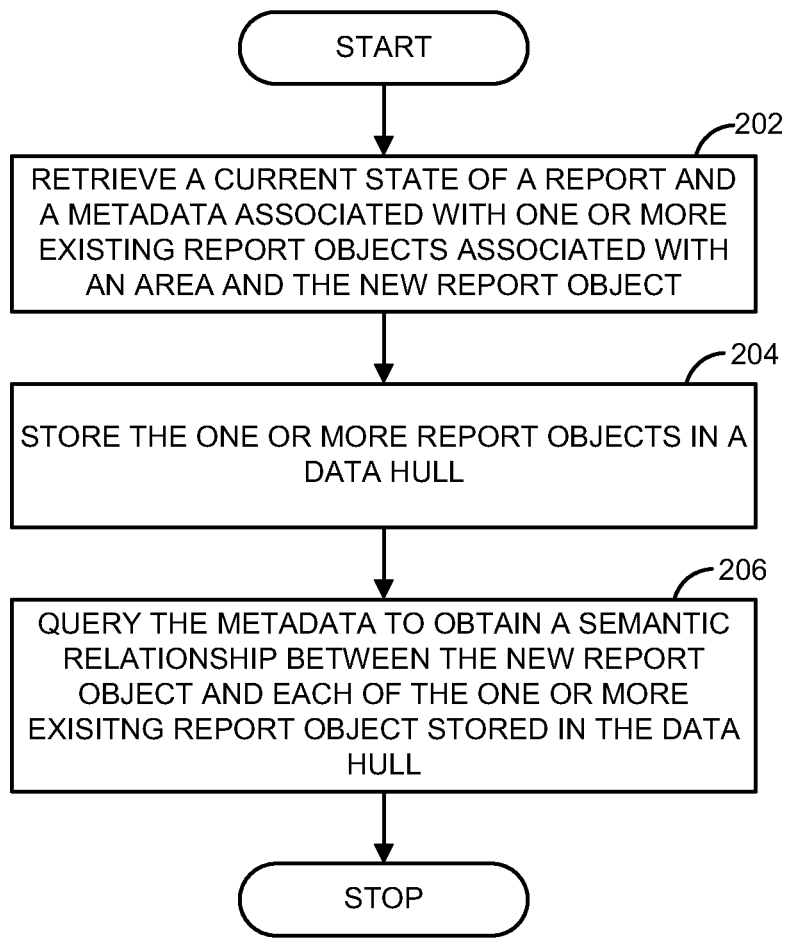
FIG. 2 is a flow diagram illustrating a method for obtaining a semantic relationship and an area type, according to an embodiment.

FIG. 2 is a flow diagram illustrating a method for obtaining the area type and the semantic relationship of block 104 of FIG. 1, according to an embodiment. Initially, at block 202 a current state of the report and a metadata associated with the one or more existing report objects and the new report object are retrieved. In one embodiment, a metadata constitutes a subset or representative values of a larger data set. In one embodiment, the metadata includes the semantic relationship between the one or more existing report objects associated with the area in which the new report object is requested to be placed, and between the new report object and the one or more existing report objects associated with the area in which the new report object is requested to be placed. In one embodiment, the metadata includes the semantic relationship between the one or more existing report objects associated with a sub-area of report, between the one or more existing report objects associated with the sub-area and the one or more existing report objects associated with the area in which the sub-area is present, and between the new report object and the one or more existing report objects associated with the sub-area and the area in which the sub-area is present.

The current state of the report includes information of the area in which the new report object is requested to be placed. In one embodiment, the information includes information of the one or more existing report objects associated with the area in which the new report object is requested to be placed and the area type (used for determination at block 104, FIG. 1) of the area. In one embodiment, the area type is defined when the area is created in the report. As discussed above, the area type may be either a static type or an iterative type.

In one embodiment, the information included in the current state of the report includes an iteration key. Each area of the report that has the area type as the iterative type has an iteration key. In one embodiment, the iteration key is initially empty when the area is created or added to the report (e.g., when the area does not include an existing report object). The iteration key stores the one or more existing report objects associated with the area having the area type as the iterative type. In one embodiment, the iteration key defines the sequence in which the one or more data elements of the one or more existing report objects associated with the area that has the area type as the iterative type are rendered during a rendering operation. In one embodiment, the iteration key stores a value indicative of a type of sequence for rendering. In one embodiment the type of sequence may be one of the following: alphabetically ascending, alphabetically descending, in an order defined by a memory that stores the one or more report objects associated with the one or more existing report objects, or in a specific order. In one embodiment, the specific order is stored in the iteration key, the specific order defining an order in which the data elements are to be rendered.

In one embodiment, a sub-area present within an area of the report has an area type as the iterative type. The sub-area of the report is initially empty when there are no report objects in the sub-area. The iteration key of the sub-area includes the one or more existing report objects associated with the sub-area. In one embodiment, the iteration key defines the sequence in which the one or more data elements of the one or more existing report objects associated with the area and the sub-area are rendered during the rendering operation, the area and the sub-area having the area type as the iterative type.

Next at block 204, the one or more existing report objects associated with the area in which the new report object is requested to be placed is stored in a data hull. In one embodiment, the data hull is a collection of the one or more existing report objects associated with the area in which the new report object is requested to be placed. In one embodiment, the data hull of the sub-area includes a collection of the one or more existing report objects associated with the sub-area and the one or more existing report objects associated with the area. In case the area within which the sub-area is present is a sub-area for another area (i.e., a parent area of the area in which the sub-area is present), the data hull of the sub-area would include a collection of the one or more existing report objects contained in the sub-area, the one or more existing report objects associated with the area, and the one or more existing report objects associated with the parent area of the area. Thus, the data hull of the sub-area includes the one or more existing report objects of the sub-area and the one or more existing report objects of all the parent areas (until the top level) of the sub-area.

Finally at block 206, the metadata is queried to obtain the semantic relationship between the new report object and each of the one or more existing report objects stored in the data hull at block 204. As discussed above, the data hull stores the one or more report objects associated with the area in which the new report object is requested to be placed. The metadata retrieved in block 202 is queried to obtain the semantic relationship between the new report object and each of the one or more existing report objects associated with the area in which the new report object is requested to be placed. In one embodiment, when the new report object is requested to be placed in a sub-area placed within an area, the metadata is queried to obtain the semantic relationship between the new report object and the one or more existing report objects associated with the sub-area and the one or more existing report objects associated with the area within which the sub-area is present.

Figure 3:
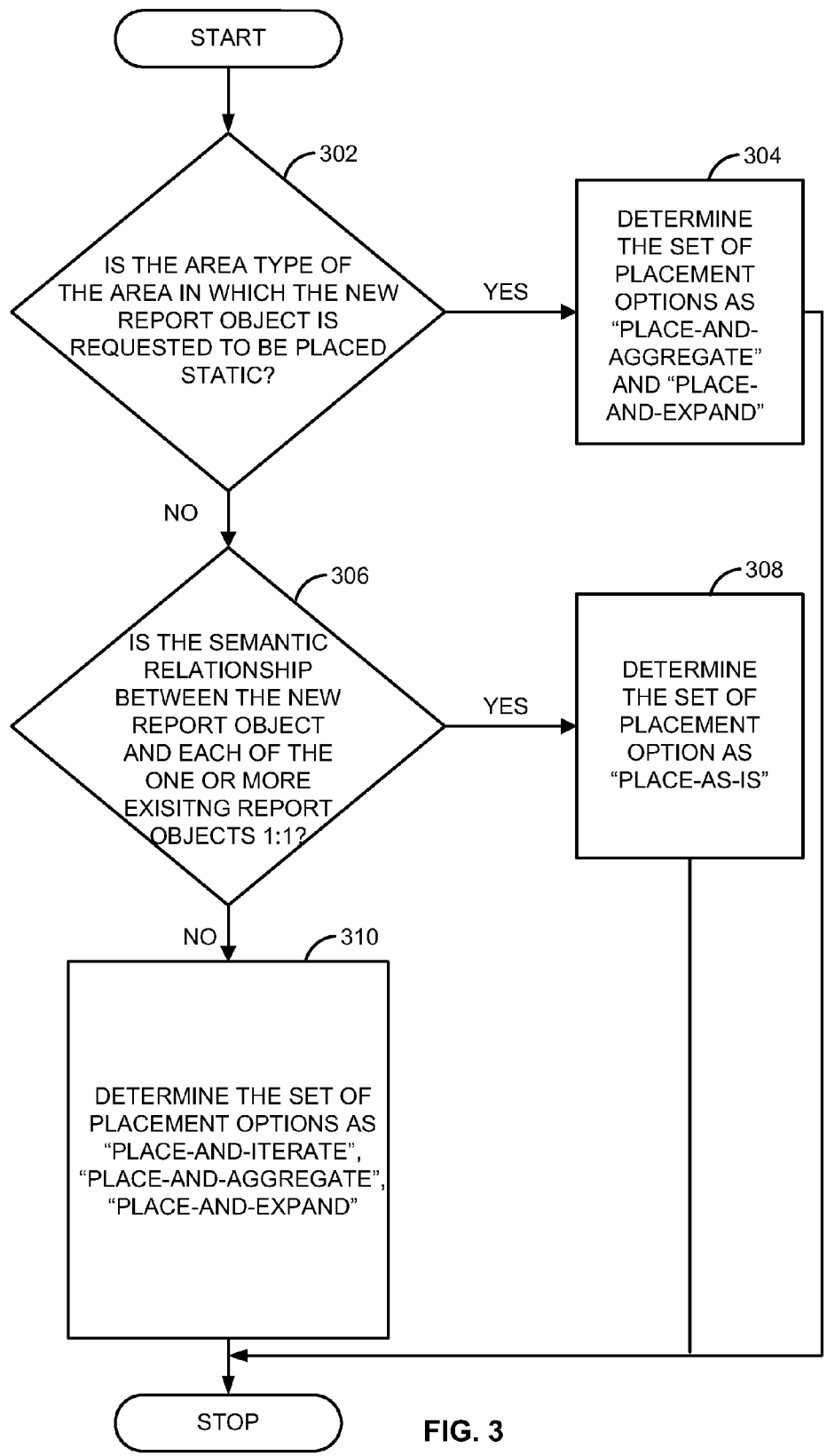
FIG. 3 is a flow diagram illustrating a method for determining the set of placement options of FIG. 1, according to an embodiment.

FIG. 3 is a flow diagram illustrating a method for determining the set of placement options in block 104 of FIG. 1, according to an embodiment. As discussed above with respect to block 104 of FIG. 1, the set of placement options for placing a new report object in an area of the report are determined based on at least one of the following: the area type (e.g., iterative type or static type) of the area in which the new report object is requested to be placed, and the semantic relationship between the new report object and each of the one or more existing report objects associated with the area in which the new report object is requested to be placed. As shown at block 302, a determination is made whether the area type of the area in which the new report object is requested to be placed is static. In case the condition in block 302 (i.e., whether the area type is static) is true, the set of placement options determined for placing the new report object in the area of the report are "place-and-aggregate" and "place-and-expand" (block 304). In one embodiment, a determination is made at block 302 whether the area type of a sub-area is static, and the set of placement options for placing the new report object in the sub-area are determined as "place-and-aggregate", and "place-and-expand".

Next, in case the condition in block 302 is false (i.e., the area type is iterative) then at block 306 a determination is made whether the semantic relationship between the new report object and each of the one or more existing report objects associated with the area is one-to-one. In one embodiment, when the new report object is requested to be placed in a sub-area placed within an area, the determination at block 306 is whether the semantic relationship between the new report object and each of the one or more existing report objects associated with the sub-area and the area in which the sub-area is located, is one-to-one. In case, the condition in block 306 is true (i.e., the semantic relationship between the new report object and the one or more existing report objects is one-to-one) the set of placement options for placing the new report object in the area of the report is determined as "place-as-is" (block 308).

In case the condition in block 306 is false (i.e., the semantic relationship between the new report object and the one or more existing report objects is one-to-many) then the set of placement options for placing the new report object in the area of the report are "place-and-iterate", "place-and-aggregate", and "place-and-expand" (block 310).

Figure 4:
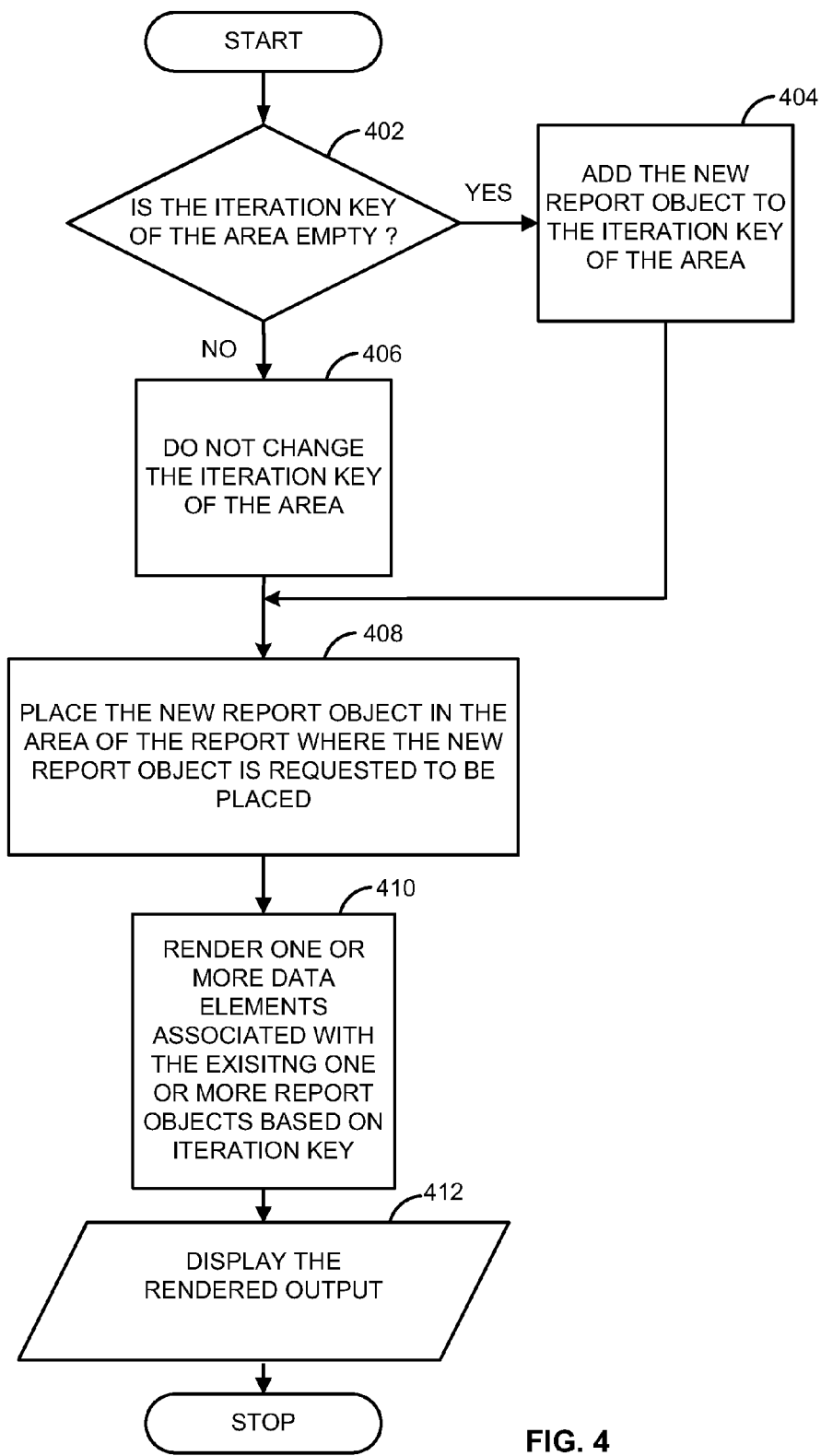
FIG. 4 is a flow diagram illustrating a method for rendering the report of FIG. 1 when a selected placement option is "place-as-is", according to an embodiment.

FIG. 4 is a flow diagram illustrating a method for rendering the report of FIG. 1 when a selected placement option is "place-as-is" from the set of placement options provided in block 106 of FIG. 1, according to an embodiment. In one embodiment, a user selects the placement option. In one embodiment, the placement option is selected automatically. As shown in blocks 306 and 308 of FIG. 3, the placement option is determined as "place-as-is" when the area type is iterative and the semantic relationship between the new report object and the one or more existing report objects associated with the area in which the new report object is requested to be placed, is one-to-one. Initially at block 402, a determination is made whether the iteration key of the area in which the new report object is requested to be placed is empty (i.e., the area in which the new report object is requested to be placed does not include one or more existing report objects). In case the condition in block 402 is true (i.e., the iteration key of the area is empty) then the new report object is added to the iteration key of the area (block 404). In case the condition in block 402 is false (i.e., the iteration key of the area is not empty) then the iteration key of the area is not changed (block 406). In one embodiment, when the new report object is requested to be placed in a sub-area placed within an area, a determination is made at block 402 whether the iteration key of the sub-area is empty. In case the iteration key of the sub-area is empty the new report object is added to the iteration key of the sub-area (block 404) else the new report object is not added to the iteration key of the sub-area (block 406).

Next at block 408, the new report object is placed in the area (or a sub-area in case the received request is to place the new report object in the sub-area) of the report in which the new report object is requested to be placed. The new report object is placed along with the existing report objects associated with the area in which the new report object is requested to be placed.

Next at block 410, the one or more data elements associated with the one or more existing report objects and the new report object are rendered based on the iteration key. Rendering may be performed in many ways such as by creating a file on a disk (e.g. text file, pdf file, or an xls file), a graphic on a computer screen, a voice output, or printing. In one embodiment, the iteration key defines the sequence in which the one or more data elements are rendered during the rendering operation. In one embodiment, when the new report object is requested to be placed in a sub-area placed within an area, the report is rendered based on the iteration key of the sub-area and the iteration key of the area in which the new report object is requested to be placed.

Finally at block 412, the rendered output obtained at block 410 may optionally be displayed. In one embodiment, the rendered output is displayed when the report is rendered as a graphic on a computer screen. In one embodiment, the rendered output is displayed on a user interface.

Figure 5:
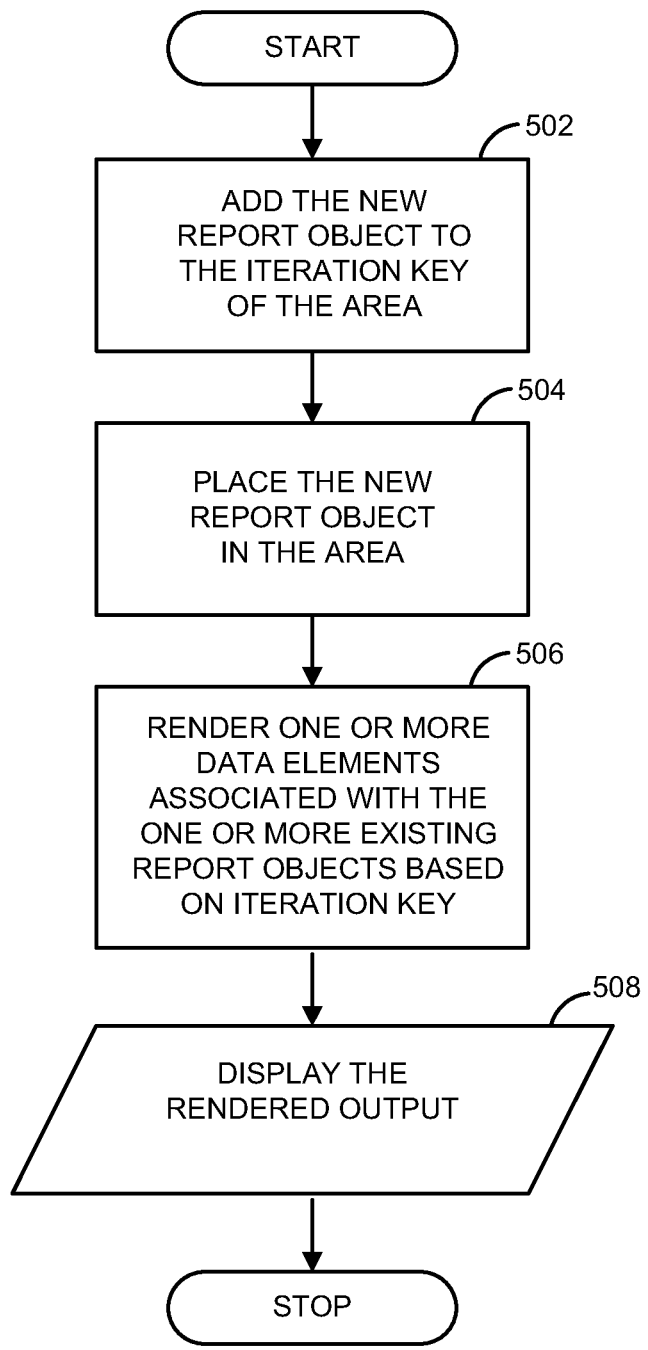
FIG. 5 is a flow diagram illustrating a method for rendering the report of FIG. 1 when a selected placement option is "place-and-iterate", according to an embodiment.

FIG. 5 is a flow diagram illustrating a method for rendering the report of FIG. 1 when a selected placement option is "place-and-iterate" from the set of placement options provided in block 106 of FIG. 1, according to an embodiment. In one embodiment, a user selects the selected placement option from the set of placement options. In one embodiment, the selected placement option is selected automatically. Initially at block 502, the new report object requested to be placed in an area of the report is added to the iteration key of the area. In one embodiment, when the new report object is requested to be placed in a sub-area placed within an area, the new report object is added to the iteration key of the sub-area. Next at block 504, the new report object is placed in the area (or a sub-area in case the new report object is requested to be placed in a sub-area present within an area of the report) in which the new report object is requested to be placed.

Next at block 506, the one or more data elements associated with each of the one or more existing report objects and the new report object are rendered based on the iteration key.

Finally at block 508, the rendered output obtained at block 506 may optionally be displayed. In one embodiment, the rendered output is displayed when the report is rendered as a graphic on a computer screen. In one embodiment, the rendered output is displayed on a user interface.

Figure 6:
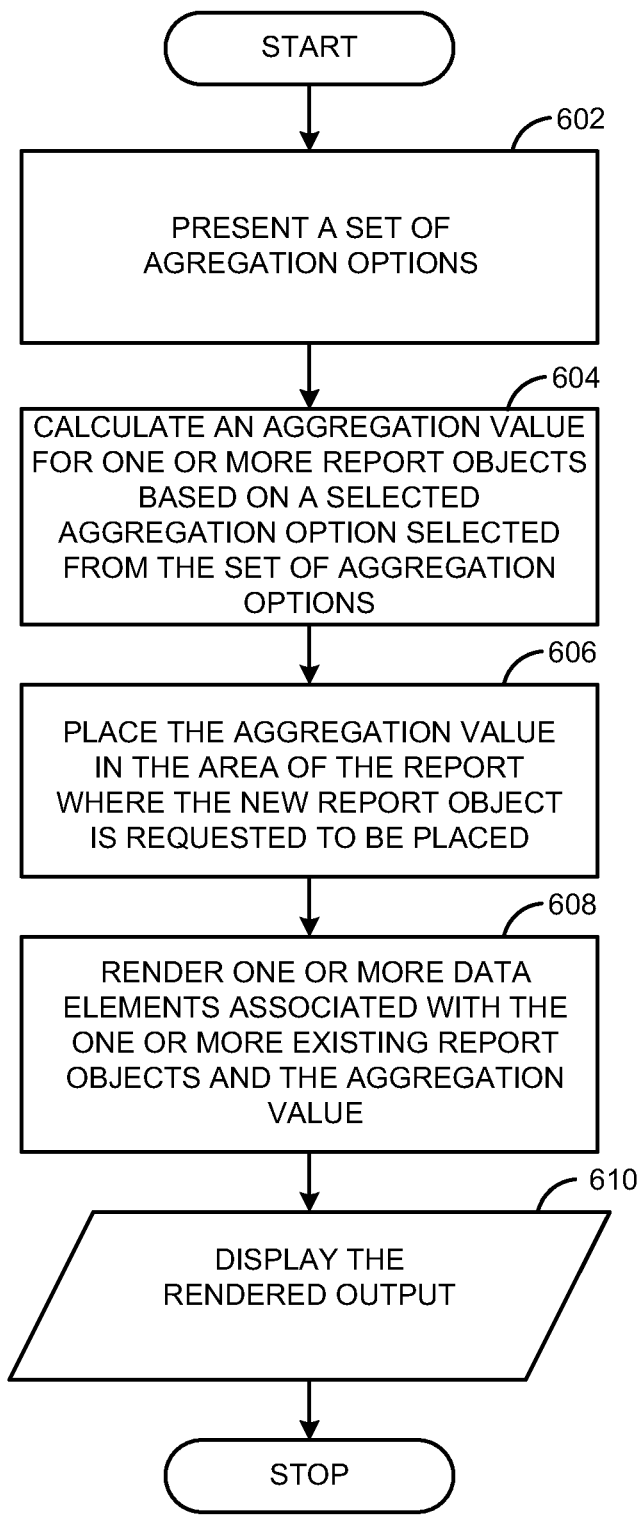
FIG. 6 is a flow diagram illustrating a method for rendering the report of FIG. 1 when a selected placement option is "place-and-aggregate", according to an embodiment.

FIG. 6 is a flow diagram illustrating a method for rendering the report of FIG. 1 when the selected placement option is "place-and-aggregate" from the set of placement options provided in block 106 of FIG. 1, according to an embodiment. In one embodiment, a user selects the selected placement option. In one embodiment, the selected placement option is selected automatically. Initially at block 602, a set of aggregation options are presented. In one embodiment, the set of placement options are presented to a user. In one embodiment, the set of aggregation options include a Sum option (sum of all data elements in the new report object), a maximum value (Max) option (refers to the data element of the new report object having the maximum value), a Count option (count of the data elements in the new report object), a minimum value (Min) option (refers to the data element of the new report object having the minimum value), and an Average option (refers to the average of all data elements contained in the new report object). In one embodiment, the set of aggregation options are presented to the user on a user interface. The user selects one of the aggregation options from the set of aggregation options presented to the user in block 602.

Next at block 604, an aggregation value is calculated for the one or more data elements associated with the new report object based on an aggregation option selected from the set of aggregation options. For example, suppose a new report object has five data elements and the aggregation option selected is count (count of the data elements associated with the new report object) then the aggregation value for the new report object is 5.

Next at block 606, the aggregation value calculated in block 604 is placed in the area (or a sub-area when the request is to place the new report object in the sub-area) in which the new report object is requested to be placed. In one embodiment, when the request is to place the new report object in a sub-area present within an area of the report, the aggregation value calculated in block 604 is placed in the sub-area.

Next at block 608, the one or more data elements associated with the one or more existing report objects and the aggregation value are rendered.

Finally at block 610, the rendered output obtained at block 608 may optionally be displayed. In one embodiment, the rendered output is displayed when the report is rendered as a graphic on a computer screen. In one embodiment, the rendered output is displayed on a user interface.

Figure 7:
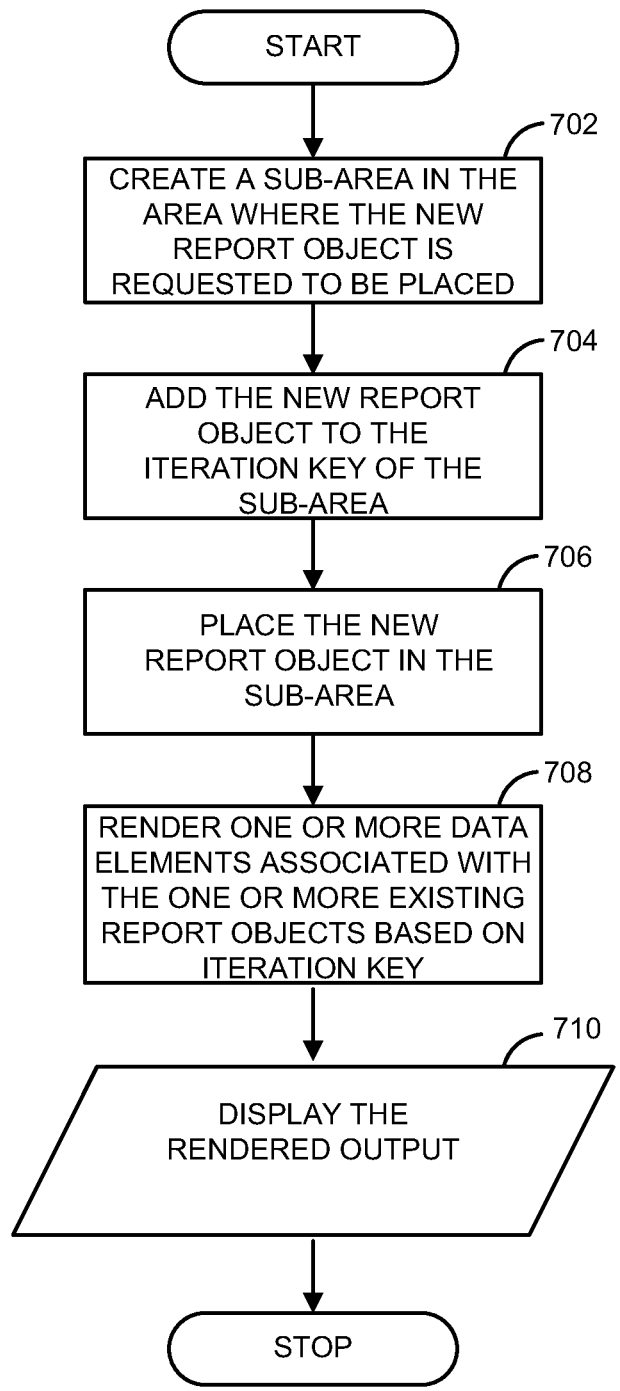
FIG. 7 is a flow diagram illustrating a method for rendering the report of FIG. 1 when the selected placement option is "place-and-expand", according to an embodiment.

FIG. 7 is a flow diagram illustrating a method for rendering the report of FIG. 1 when the selected placement option is "place-and-expand" from the set of placement options provided in block 106 of FIG. 1, according to an embodiment. In one embodiment, a user selects the selected placement option from the set of placement options. In one embodiment, the selected placement option is selected automatically. Initially at block 702, a sub-area is created within the area in which the new report object is requested to be placed. In one embodiment, the sub-area created in block 702 has an area type as iterative type. The sub-area has an iteration key which is empty when the sub-area is created.

Next at block 704, the new report object is added to the iteration key of the sub-area. As discussed above, the iteration key defines the sequence in which the one or more data elements of each of the report objects stored in the iteration key are rendered. In the present embodiment, the sub-area of the report is rendered by sequentially rendering the one or more data elements associated with the new report object. Next at block 706, the new report object is placed in the sub-area of the area in which the new report object is requested to be placed.

Next at block 708, the one or more data elements associated with the one or more existing report objects and the new report object are rendered. In one embodiment, when the area in which the new report object is requested to be placed has area type as the iterative type, the one or more data elements associated with the one or more existing report objects and the new report object are rendered based on the iteration key of the area and the iteration key of the sub-area (that includes the new report object). In one embodiment, when the area in which the new report object is requested to be placed has area type as the static type, the one or more data elements associated with the one or more existing report objects and the new report object are rendered based on the iteration key of the sub-area.

Finally at block 710, the rendered output obtained at block 708 may optionally be displayed. In one embodiment, the rendered output is displayed when the report is rendered as a graphic on a computer screen. In one embodiment, the rendered output is displayed on a user interface.

Figure 8:
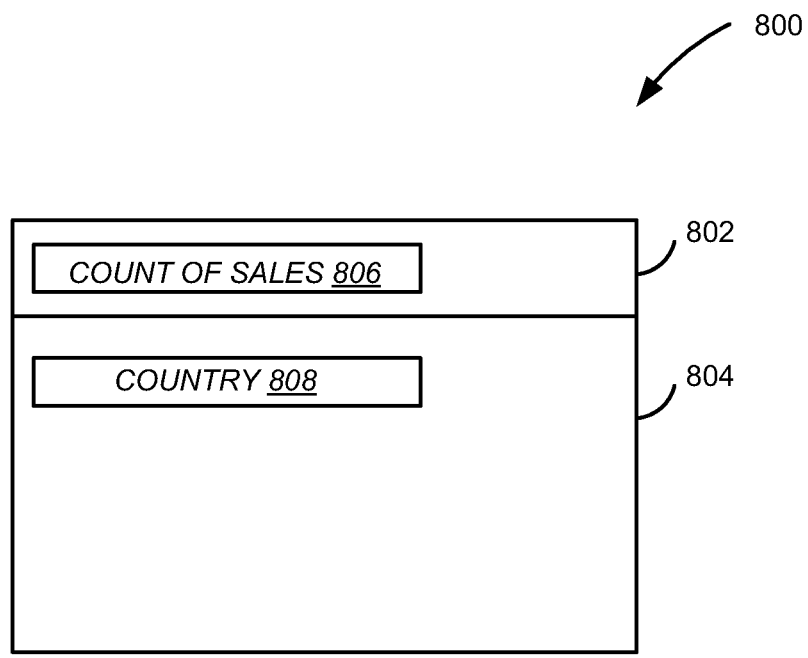
FIG. 8 illustrates an exemplary report, according to an embodiment.

FIG. 8 illustrates an exemplary report 800, according to an embodiment. The report 800 has an area 802 and an area 804. In one embodiment, each of the areas 802 and 804 of the report 800 may include one or more existing report objects. The area 802 of the report 800 has an existing report object 806 "Count of Sales," and the area 804 of the report 800 has an existing report object 808 "Country".

In one embodiment, the existing report object 806 and the existing report object 808 include one or more data elements. The existing report object 806 "Count of Sales" includes data element 10,000, the existing report object 808 "Country" includes data elements Canada, France, and Germany.

The area 802 has an area type as the static type, and the area 804 has an area type as the iterative type. As discussed above, the area 802 that has the area type as the static type is rendered by rendering the data elements (i.e., existing report object 806 "Count of Sales") associated with the area 802.

The area 802 that has the area type as the static type is rendered by rendering the data element 10,000 of the existing report object 806 "Count of Sales" associated with the area 802. In one embodiment, the area 802 is rendered by rendering the data element 10,000 of the existing report object 806 "Count of Sales".

The area 804 that has the area type as the iterative type has an iteration key. The iteration key of the area 804 stores the existing report object 808 "Country" associated with the area 804. In one embodiment, the iteration key defines the sequence in which the data elements of the existing report object 808 "Country" are rendered during the rendering operation. The data elements Canada, France, and Germany of the existing report object 808 "Country" are rendered sequentially and repeatedly based on the iteration key. In an exemplary embodiment, initially data element Canada (existing report object 808 "Country") is rendered, followed by data element France (existing report object 808 "Country"), and finally data element Germany (existing report object 808 "Country") is rendered.

Figure 9A:
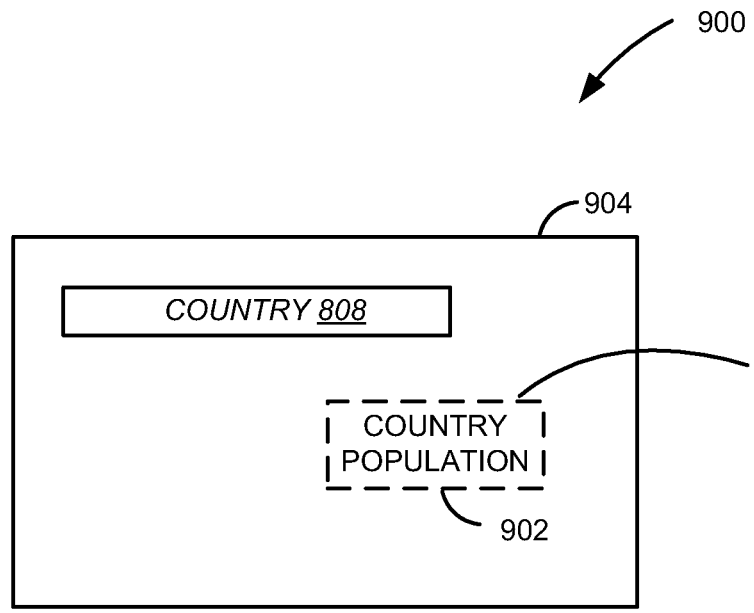
FIG. 9A illustrates an exemplary report that receives a request to place a new report object, according to another embodiment.

FIG. 9A is an exemplary report 900, according to another embodiment. The report 900 has an area 904 that has an area type as iterative type. An existing report object 808 "Country" is associated with the area 904 of the report 900. The existing report object 808 "Country" includes data elements Canada, France, and Germany.

As discussed above in block 102 of FIG. 1, initially the new report object 902 "Country Population" is requested to be placed in the area 904 of the report 900. The new report object 902 "Country Population" has data elements 30M, 60M, and 80M. In existing systems, the report designer does not understands whether placing the new report object 902 "Country Population" in the area 904 of the report 900 along with the existing report object 808 "Country" would preserve the validity of rendering of the report 900. This would cause the rendered output of the report 900 to be semantically incorrect.

The present invention solves this problem by providing semantic guidance to the report designer for placing the new report object 902 "Country Population" in the area 904 of the report 900. In one embodiment, the semantic guidance is based on a semantic relationship between the new report object 902 "Country Population" and the existing report object 808 "Country". The semantic guidance provided to the report designer ensures that the report 900 rendered after placement of the new report object 902 "Country Population" in the area 904 of the report 900 is semantically correct.

Next a current state of the report 900 and a metadata associated with the existing report object 808 "Country" and the new report object 902 "Country Population" is retrieved (block 202, FIG. 2). The current state of the report 900 includes information of the area 904 in which the new report object 902 "Country Population" is requested to be placed. The information of the area 904 includes information of the existing report object 808 "Country" associated with the area 904 in which the new report object 902 "Country Population" is requested to be placed, and the area type of the area 904 in which the new report object 902 "Country Population" is requested to be placed. As discussed above, the area type is iterative type.

The metadata includes a semantic relationship between the new report object 902 "Country Population" and the existing report object 808 "Country". The semantic relationship between the new report object 902 "Country Population" and the existing report object 808 "Country" is one-to-one, as each data element of the existing report object 808 "Country" (i.e., Canada, France, and Germany) has a single corresponding data element in the new report object 902 "Country Population".

The existing report object 808 "Country" is stored in a data hull of the area 904 (block 204, FIG. 2). Next, the metadata is queried to obtain the semantic relationship between the new report object 902 "Country Population" and the existing report object 808 "Country" associated with the area 904 in which the new report object 902 "Country Population" is requested to be placed (block 206, FIG. 2). As discussed above, the semantic relationship between the new report object 902 "Country Population" and the existing report object 808 "Country" is one-to-one.

Next, a set of placement options are determined for placing the new report object 902 "Country Population" in the area 904 of the report 900 (block 104, FIG. 1). The set of placement options are determined based on at least one of the area type (i.e., iterative type), and the semantic relationship between the new report object 902 "Country Population" and the existing report object 808 "Country". In the present embodiment, the area type (of the area 904) is iterative type, and the semantic relationship between the new report object 902 "Country Population" and the existing report object 808 "Country" is one-to-one, therefore the set of placement options determined for placing the new report object 902 "Country Population" in the area 904 of the report 900 is "place-as-is" (blocks 306 and block 308, FIG. 3).

Figure 9B:
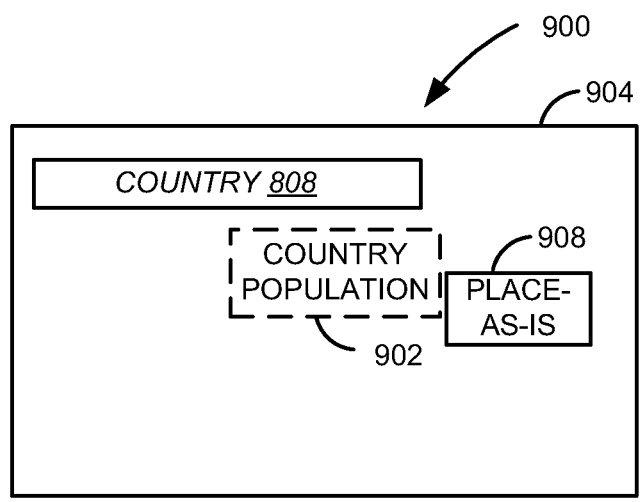
FIG. 9B illustrates a set of placement options for placing a new report object in an area of the report of FIG. 9A, according to an embodiment.

Next, the set of placement options are provided based on the determination (block 106, FIG. 1). FIG. 9B illustrates the set of placement options 908 being provided for placing the new report object 902 "Country Population" in the area 904 of the report 900 of FIG. 9A, according to an embodiment. As shown, the set of placement option 908 provided is "place-as-is". In one embodiment, the set of placement options 908 are provided on a user interface. In one embodiment, the set of placement options 908 are provided to a user on a user interface.

In one embodiment, when the "place-as-is" 908 is selected, a determination is made whether the iteration key of the area 904 in which the new report object 902 "Country Population" is requested to be placed is empty (block 402, FIG. 4). The iteration key of the area 904 in which the new report object 902 "Country Population" is requested to be placed stores the existing report object 808 "Country" (i.e., is not empty). Therefore, the new report object 902 "Country Population" is not added to the iteration key of the area 904 (block 406, FIG. 4).

Figure 9C:
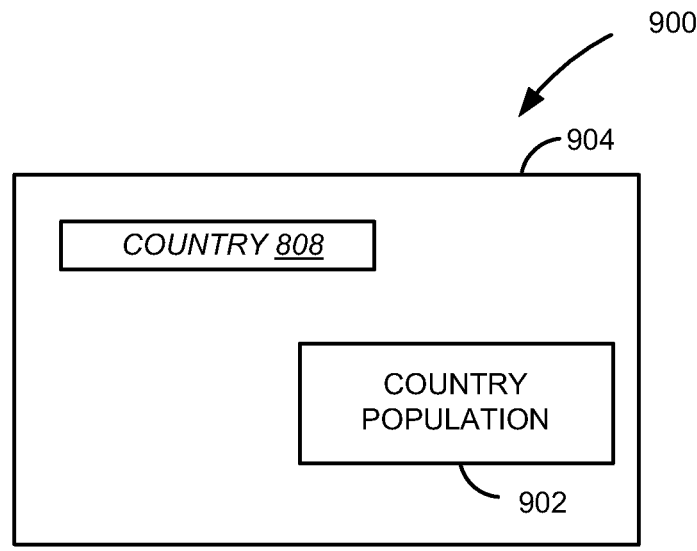
FIG. 9C illustrates the new report object placed in the area of the report of FIG. 9A, according to an embodiment.

The new report object 902 "Country Population" is then placed in the area 904 of the report 900 (block 408, FIG. 4). FIG. 9C illustrates the new report object 902 "Country Population" placed in the area 904 of the report 900, according to an embodiment. As shown, the new report object 902 "Country Population" is placed along with the existing report object 808 "Country" in the area 904 of the report 900.

Figure 9D:
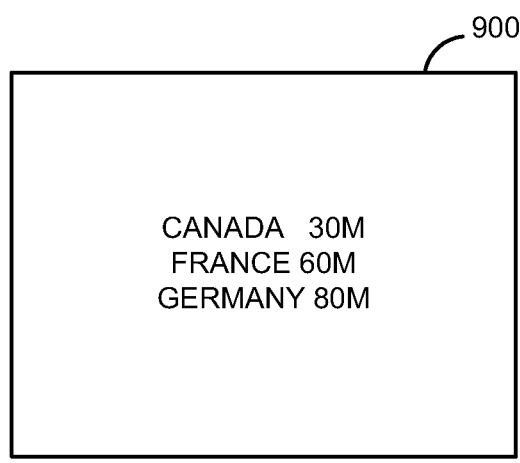
FIG. 9D illustrates rendering of the report of FIG. 9A, according to an embodiment.

Finally, the data elements of the existing report object 808 "Country" and the new report object 902 "Country Population" are rendered based on the iteration key of the area 904 (block 410, FIG. 4). FIG. 9D illustrates the rendering of the report 900 of FIG. 9A when the selected placement option is "place-as-is" 908, according to an embodiment. As the area 904 has the area type as iterative type, the report 900 is rendered based on the iteration key of the area 904. As discussed above, the iteration key of the area 904 includes the existing report object 808 "Country". The report 900 is rendered by sequentially rendering the data elements Canada, France, and Germany associated with the existing report object 808 "Country" stored in the iteration key. In one embodiment, the iteration key defines the sequence in which the data elements of the report objects (existing report object 808 "Country") stored in the iteration key are rendered. As shown in FIG. 9D initially the first data element Canada of the existing report object 808 "Country" and the corresponding data element 30M of the new report object 902 "Country Population" are rendered. Next, the second data element France (existing report object 808 "Country") and the corresponding data element 60M (new report object 902 "Country Population") are rendered. Finally, the data element Germany (existing report object 808 "Country") and the corresponding data element 80M (new report object 902 "Country Population") are rendered.

Figure 10A:
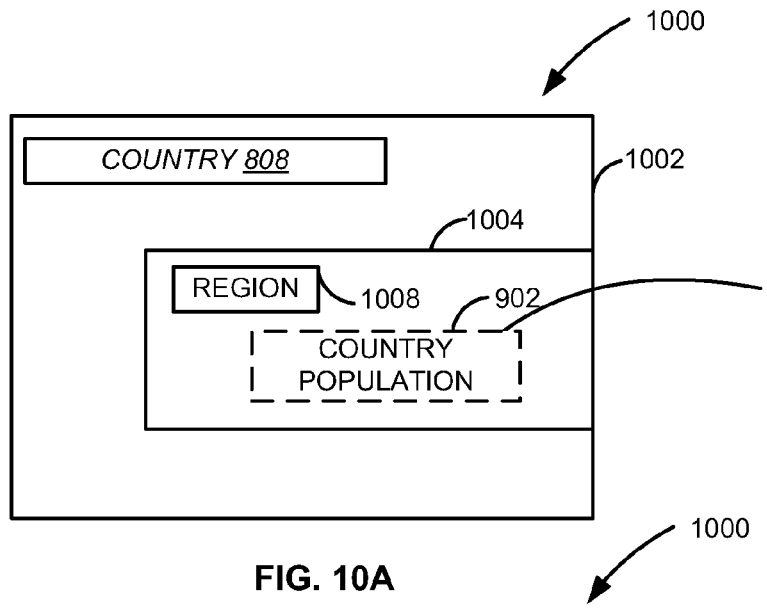
FIG. 10A illustrates an exemplary report that receives a request to place a new report object, according to an embodiment.

FIG. 10A illustrates an exemplary report 1000 that receives a request to place a new report object, according to an embodiment. The report 1000 includes an area 1002 and a sub-area 1004 present within the area 1002. The existing report object 808 "Country" is associated with the area 1002. The existing report object 1008 "Region" is associated with the sub-area 1004.

Initially, a request is received to place the new report object 902 "Country Population" in the sub-area 1004 that has the existing report object 1008 "Region" (block 102, FIG. 1). As discussed above, the existing report object 808 "Country" has data elements Canada, France, and Germany. The existing report object 1008 "Region" has data elements BC, ON, IdF, and BW. The abbreviations respectively stand for British Columbia, Ontario, Île-de-France, and Baden-Württemberg. The new report object 902 "Country Population" has data elements 30M, 60M, and 80M. The area 1002 and the sub-area 1004 have area type as iterative type. The area 1002 has an iteration key that stores the existing report object 808 "Country" associated with the area 1002. The sub-area 1004 has an iteration key that stores the existing report object 1008 "Region" associated with the sub-area 1004.

Next, a current state of the report 1000 and a metadata associated with the existing report object 808 "Country", existing report object 1008 "Region", and new report object 902 "Country Population" is retrieved (block 202, FIG. 2). In one embodiment, the current state of the report 1000 includes information of the sub-area 1004 in which the new report object 902 "Country Population" is requested to be placed and the area 1002 in which the sub-area 1004 is present. The information includes information of the existing report object 1008 "Region" associated with the sub-area 1004, the existing report object 808 "Country" associated with the area 1002, and the area type of the sub-area 1004 in which the new report object 902 "Country Population" is requested to be placed.

In one embodiment, the metadata includes the semantic relationship between the existing report object 1008 "Region" and the existing report object 808 "Country", and between the new report object 902 "Country Population" and each of the existing report object 1008 "Region" and the existing report object 808 "Country". The new report object 902 "Country Population" has a direct one-to-one relationship with the existing report object 808 "Country", and a transitive one-to-one relationship with the existing report object "Region". The existing report object 808 "Country" has a one-to-many relationship with the existing report object 1008 "Region" (as a single data element of the existing report object 808 "Country" is related to one or more data elements of the existing report object 1008 "Region").

A data hull of the sub-area 1004 stores the existing report object 1008 "Region" associated with the sub-area 1004, and the existing report object 808 "Country" associated with the area 1002 in which the sub-area 1004 is placed (block 204, FIG. 2). Next, the metadata is queried to obtain the semantic relationship between the new report object 902 "Country Population" and each of the existing report objects stored in the data hull of the sub-area 1004 (block 206, FIG. 2).

Next, a set of placement options are determined for placing the new report object 902 "Country Population" in the sub-area 1004 based on at least one of the following: the area type of the sub-area 1004 in which the new report object 902 "Country Population" is requested to be placed, and the semantic relationship between the new report object 902 "Country Population" and each of the existing report object 1008 "Region" and the existing report object 808 "Country". The area type of the sub-area 1004 in which the new report object 902 "Country Population" is requested to be placed is iterative type. The semantic relationship between the new report object 902 "Country Population" and each of the existing report object 1008 "Region" and the existing report object 808 "Country" is one-to-one, therefore the set of placement options determined is "place-as-is." (block 306 and block 308, FIG. 3).

Figure 10B:
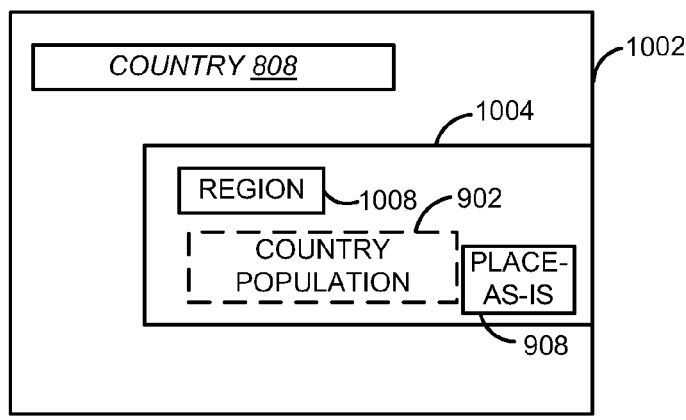
FIG. 10B illustrates a set of placement options for placing the new report object in the report of FIG. 10A, according to an embodiment.

Next, the set of placement options are provided based on the determination (block 106, FIG. 1). In one embodiment, the set of placement options are provided to a user on a user interface. FIG. 10B illustrates the set of placement options 908 being provided for placing the new report object 902 "Country Population" in the sub-area 1004 of the report 1000 of FIG. 10A, according to an embodiment. As shown, the set of placement options 908 provided for placing the new report object 902 "Country Population" in the sub-area 1004 is "place-as-is".

In one embodiment, when the selected placement option is "place-as-is" 908 a determination is made whether the iteration key of the sub-area 1004 in which the new report object 902 "Country Population" is requested to be placed is empty (block 402, FIG. 4). In the present embodiment, the iteration key of the sub-area 1004 in which the new report object 902 "Country Population" is requested to be placed includes the existing report object 1008 "Region" (i.e., is not empty). Therefore, the new report object 902 "Country Population" is not added to the iteration key of the sub-area 1004 (block 406, FIG. 4).

Figure 10C:
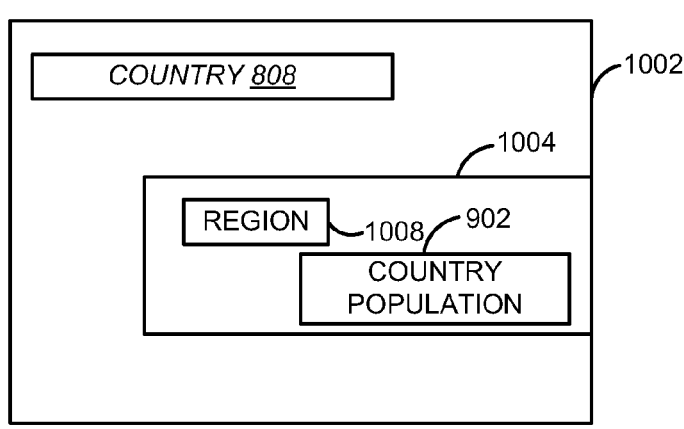
FIG. 10C illustrates the new report object placed in the report of FIG. 10A, according to an embodiment.

The new report object 902 "Country Population" is then placed in the sub-area 1004 of the report 1000 (block 408, FIG. 4). FIG. 10C illustrates the new report object 902 "Country Population" placed in the sub-area 1004 of the report 1000, according to an embodiment. As shown, the new report object 902 "Country Population" is placed along with the existing report object 1008 "Region" in the sub-area 1004 of the report 1000.

Figure 10D:
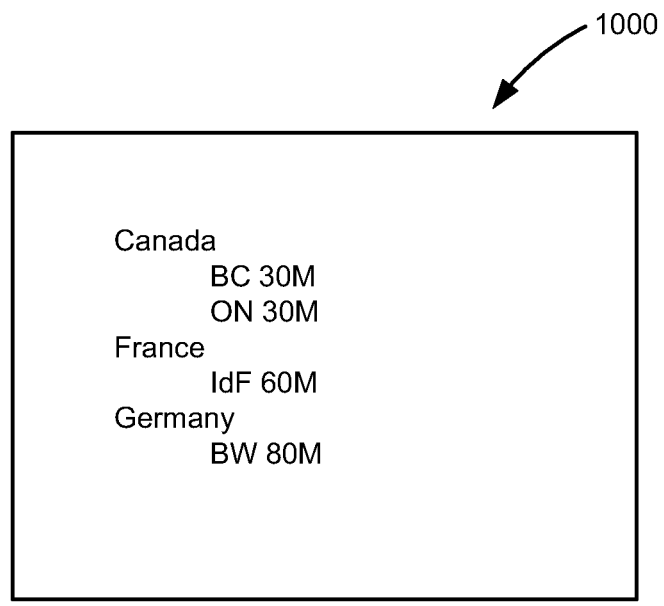
FIG. 10D illustrates rendering of the report of FIG. 10A, according to an embodiment.

Finally, the report 1000 is rendered based on the iteration key of the area 1002 and the iteration key of the sub-area 1004 (block 410, FIG. 4). FIG. 10D illustrates rendering of the report 1000 of FIG. 10A when the selected placement option is "place-as-is" 908, according to an embodiment. The iteration key of the area 1002 stores the existing report object 808 "Country". The iteration key of the sub-area 1004 stores the existing report object 1008 "Region". In one embodiment, the iteration key of the area 1002 and the iteration key of the sub-area 1004 define the sequence in which the data elements of the existing report object 808 "Country" and the existing report object 1008 "Region" are rendered. Initially, the first data element Canada of the existing report object 808 "Country" is rendered. Next, the data element BC (of the existing report object 1008 "Region") and 30M (of the new report object 902 "Country Population") corresponding to the data element Canada (existing report object 808 "Country") are rendered. Next, the data element ON (of the existing report object 1008 "Region") and the data element 30M (of the new report object 902 "Country Population") corresponding to the data element Canada are rendered.

Next, the second data element France of the existing report object 808 "Country" is rendered. After rendering the second data element France, the data element IdF (existing report object 1008 "Region") and the data element 60M (new report object 902 "Country Population") corresponding to the data element France are rendered.

Next, the last data element Germany of the existing report object 808 "Country" is rendered. Finally, the last data elements BW (existing report object 1008 "Region") and 80M (new report object 902 "Country Population") corresponding to the data element Germany are rendered.

Figure 11A:
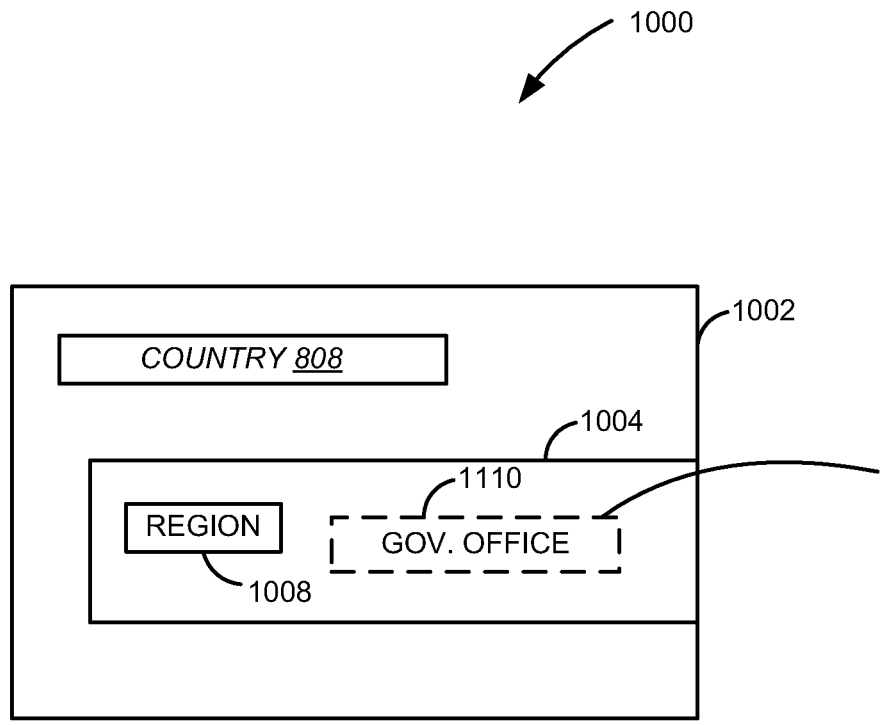
FIG. 11A illustrates the report of FIG. 10A receiving a request to place a new report object, according to an embodiment.

FIG. 11A illustrates the report 1000 of FIG. 10A that receives a request to place a new report object, according to another embodiment. As shown, a new report object 1110 "GovOffice" is requested to be placed in the sub-area 1004 of the report 1000. As discussed above, the existing report object 808 "Country" has data elements Canada, France, and Germany, the existing report object 1008 "Region" has data elements BC, ON, IdF, and BW. The new report object 1110 "GovOffice" has data elements Water, Agriculture, Water, Water, Water, and Agriculture. As discussed above, the area type (of the area 1002 and the sub-area 1004) is iterative type.

Figure 11B:
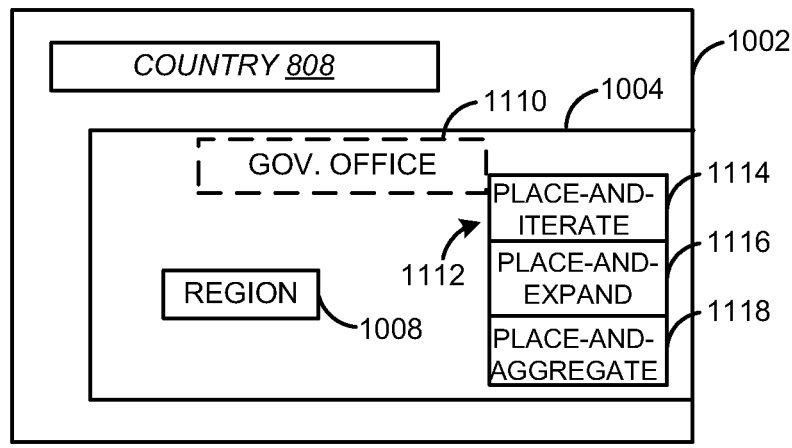
FIG. 11B illustrates a set of placement options for placing the new report object in the report of FIG. 11A, according to an embodiment.

FIG. 11B illustrates a set of placement options 1112 for placing the new report object 1110 "GovOffice" in the report of FIG. 10A, according to an embodiment. As discussed above, the set of placement options 1112 are determined based on at least one of the following: the area type of the sub-area 1004 in which the new report object 1110 "GovOffice" is requested to be placed, and the semantic relationship between the new report object 1110 "GovOffice" and the existing report object 1008 "Region" associated with the sub-area 1004, and the existing report object 808 "Country" associated with the area 1002. The semantic relationship between the new report object 1110 "GovOffice" and the existing report object 1008 "Region" and the existing report object 808 "Country" is one-to-many. As the area type of the sub-area 1004 in which the new report object 1110 "GovOffice" is requested to be placed is iterative type, and the semantic relationship between the new report object 1110 "GovOffice" and the existing report object 1008 "Region" is one-to-many, the set of placement options 1112 are determined as "place-and-iterate" 1114, "place-and-expand" 1116, and "place-and-aggregate" 1118 (block 306 and block 310, FIG. 3). In one embodiment, the set of placement options 1112 are presented to a user.

Figure 12A:
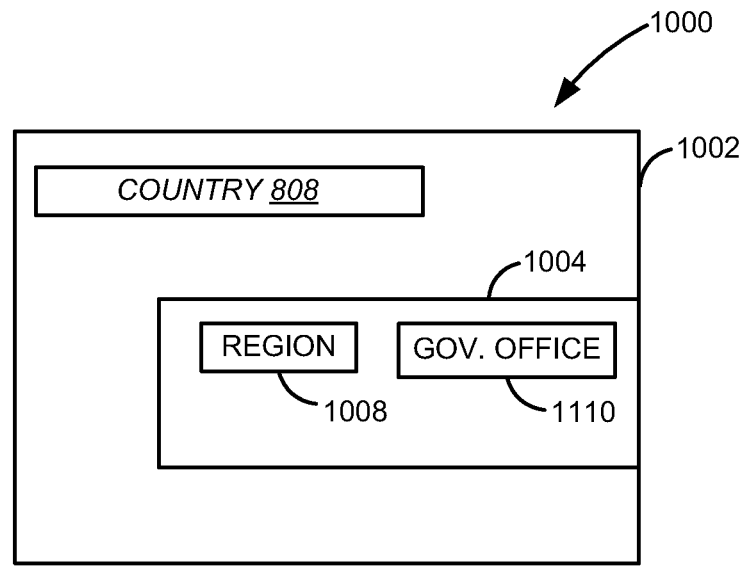
FIG. 12A illustrates the new report object placed in the report of FIG. 11A when the selected placement option is "place-and-iterate", according to an embodiment.

FIG. 12A illustrates the report 1000 of FIG. 11A when the selected placement option is "place-and-iterate" 1114, according to an embodiment. Initially, the new report object 1110 "GovOffice" is added to the iteration key of the sub-area 1004 in which the new report object 1110 "GovOffice" is requested to be placed (block 502, FIG. 5). After the addition, the iteration key of the sub-area 1004 stores the existing report object 1008 "Region" and the new report object 1110 "GovOffice". Next as shown in FIG. 12A, the new report object 1110 "GovOffice" is placed in the sub-area 1004 of the report 1000 (block 504, FIG. 5).

Finally, the report 1000 is rendered based on the iteration key of the area 1002 and the iteration key of the sub-area 1004 (block 506, FIG. 5). The iteration key of the area 1002 and the iteration key of the sub-area 1004 define the sequence in which the data elements included in the existing report object 808 "Country" associated with the area 1002, and the existing report object 1008 "Region" associated with the sub-area 1004 are rendered.

Figure 12B:
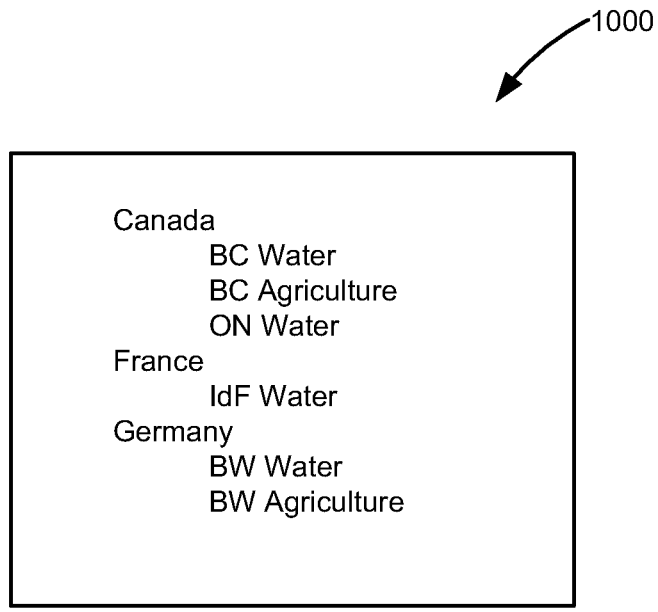
FIG. 12B illustrates the rendering of the report of FIG. 11A when the selected placement option is "place-and-iterate", according to an embodiment.

FIG. 12B illustrates the rendering of the report 1000 of FIG. 11A when the selected placement option is "place-and-iterate" 1114, according to an embodiment. The iteration key of the area 1002 includes the existing report object 808 "Country." The iteration key of the sub-area 1004 includes the existing report object 1008 "Region" and the new report object 1110 "GovOffice". During the rendering of the report 1000, the sub-area 1004 would be rendered using the iteration key that includes both the existing report object 1008 "Region" and the new report object 1110 "GovOffice".

As shown, initially the first data element Canada of the existing report object 808 "Country" is rendered. Next, the data elements of the existing report object 1008 "Region" and the corresponding data elements of the new report object 1110 "GovOffice" are rendered. As shown, the first data element BC (existing report object 1008 "Region") is rendered along with the corresponding data element Water (new report object 1110 "GovOffice"). Next, the first data element BC (existing report object 1008 "Region") is rendered along with the corresponding data element Agriculture (new report object 1110 "GovOffice"). As discussed above, the iteration key of the sub-area 904 includes the existing report object 1008 "Region" and the new report object 1110 "GovOffice". The iteration key defines the sequence in which the data elements of the report objects stored in the iteration key are rendered. Therefore as shown here, the data element BC (existing report object 1008 "Region") that has two corresponding data elements Water and Agriculture in the new report object 1110 "GovOffice" is first rendered with data element Water and then with data element Agriculture. Next, the second data element ON (existing report object 1008 "Region") is rendered along with the corresponding data element Water (new report object 1110 "GovOffice").

After rendering the data elements of existing report object 1008 "Region" and new report object 1110 "GovOffice" corresponding to the data element Canada (existing report object 808 "Country"), the second data element France is rendered. Next, the data element IdF (existing report object 1008 "Region") is rendered along with the corresponding data element Water (new report object 1110 "GovOffice").

Next, the last data element Germany is rendered. Finally, the data elements of the existing report object 1008 "Region" and new report object 1110 "GovOffice" corresponding to the Germany are rendered. As shown, the first data element BW (existing report object 1008 "Region") is rendered along with the corresponding data element Water (new report object 1110 "GovOffice"), and finally the data element BW (existing report object 1008 "Region") is rendered along with the corresponding data element Agriculture (new report object 1110 "GovOffice").

Figure 13A:
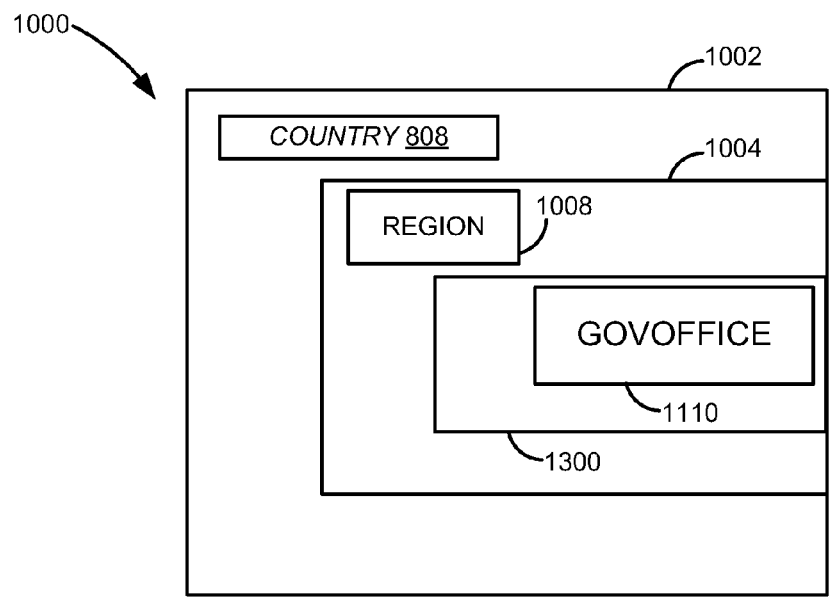
FIG. 13A illustrates the new report object placed in the report of FIG. 11A when the selected placement option is "place-and-expand", according to an embodiment.

FIG. 13A illustrates the report 1000 of FIG. 11A when the selected placement option is "place-and-expand" 1116 in FIG. 11B, according to an embodiment. Initially a sub-area 1300 is created within the sub-area 1004 where the new report object 1110 "GovOffice" is requested to be placed (block 702, FIG. 7). The sub-area 1300 has an iteration key, which is empty when the sub-area 1300 is created. Next, the new report object 1110 "GovOffice" is added to the iteration key of the sub-area 1300 (block 704, FIG. 7). The iteration key of the sub-area 1300 includes the new report object 1110 "GovOffice". Next, as shown in FIG. 13A the new report object 1110 "GovOffice" is placed in the created sub-area 1300 (block 706, FIG. 7).

Figure 13B:
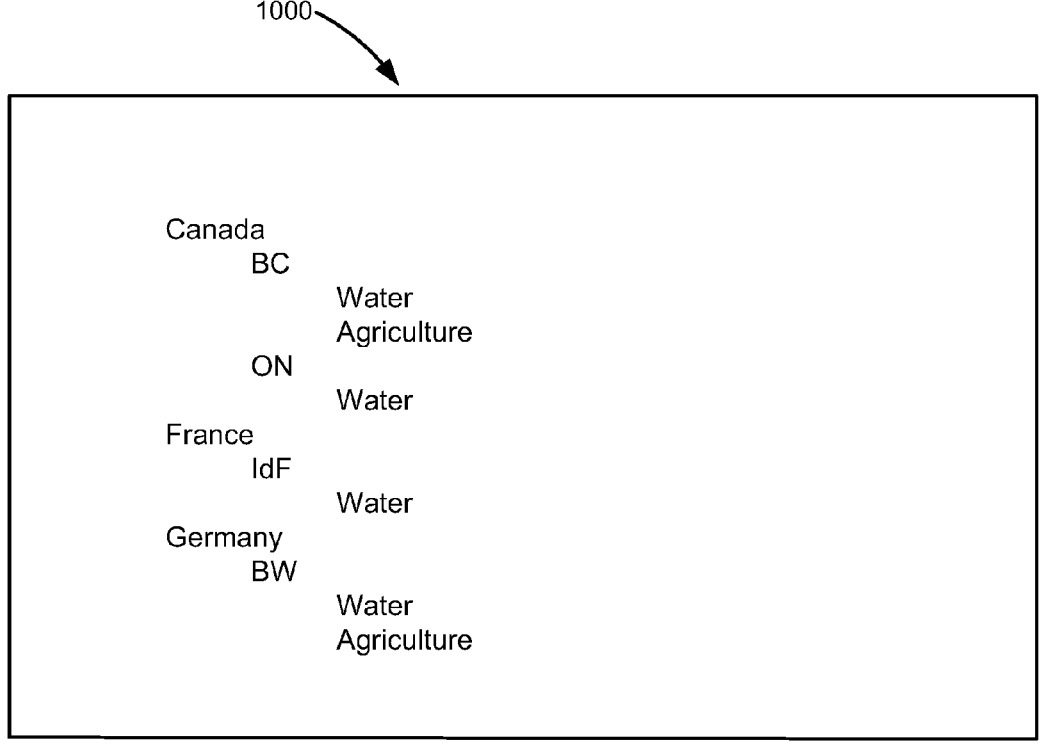
FIG. 13B illustrates the rendering of the report of FIG. 11A when the selected placement option is "place-and-expand", according to an embodiment.

Finally, the report 1000 is rendered based on the iteration key of the area 1002, iteration key of the sub-area 1004, and the iteration key of the sub-area 1300 (block 708, FIG. 7). FIG. 13B illustrates the rendering of the report of FIG. 13A, according to an embodiment. The iteration key of the area 1002, sub-area 1004, and sub-area 1300 define the sequence in which the data elements included in the existing report object 808 "Country", existing report object 1008 "Region", and the new report object 1110 "GovOffice" are rendered during the rendering operation. The iteration key of the area 1002 includes the existing report object 808 "Country". The iteration key of the sub-area 1004 includes the existing report object 1008 "Region", and the iteration key of the sub-area 1300 includes the new report object 1110 "GovOffice". As shown, initially the first data element Canada of the existing report object 808 "Country" is rendered. Next, the first data element BC of the existing report object 1008 "Region" corresponding to the data element Canada (existing report object 808 "Country") is rendered. Next, the data elements Water and Agriculture (new report object 1110 "GovOffice") corresponding to the data element BC (existing report object 1008 "Region") are rendered sequentially. Next, the second data element ON of the existing report object 1008 "Region" corresponding to the data element Canada (existing report object 808 "Country") is rendered followed by the rendering of the data element Water (new report object 1110 "GovOffice") corresponding to the data element ON (existing report object 1008 "Region").

Next, the second data element France of the existing report object 808 "Country" is rendered, followed by the rendering of the data element IdF (existing report object 1008 "Region") corresponding to the data element France (existing report object 808 "Country"). Next, the data element Water (new report object 1110 "GovOffice") corresponding to the data element IdF (existing report object 1008 "Region") is rendered.

Next, the third data element Germany of the existing report object 808 "Country" is rendered, followed by the rendering of the data element BW (existing report object 1008 "Region") corresponding to the data element Germany. Finally, the data elements Water, and Agriculture (new report object 1110 "GovOffice") corresponding to the existing report object 1008 "Region" BW are rendered, sequentially.

As shown above, the data elements of each of the report objects "Country", "Region", and "City" are being rendered sequentially as the report 1000 is being rendered based on the iteration key of the area 1002 (that stores the existing report object 808 "Country"), the iteration key of the sub-area 1004 (that stores the existing report object 1008 "Region"), and the iteration key of the sub-area 1300 (that stores the new report object 1110 "GovOffice").

Figure 14A:
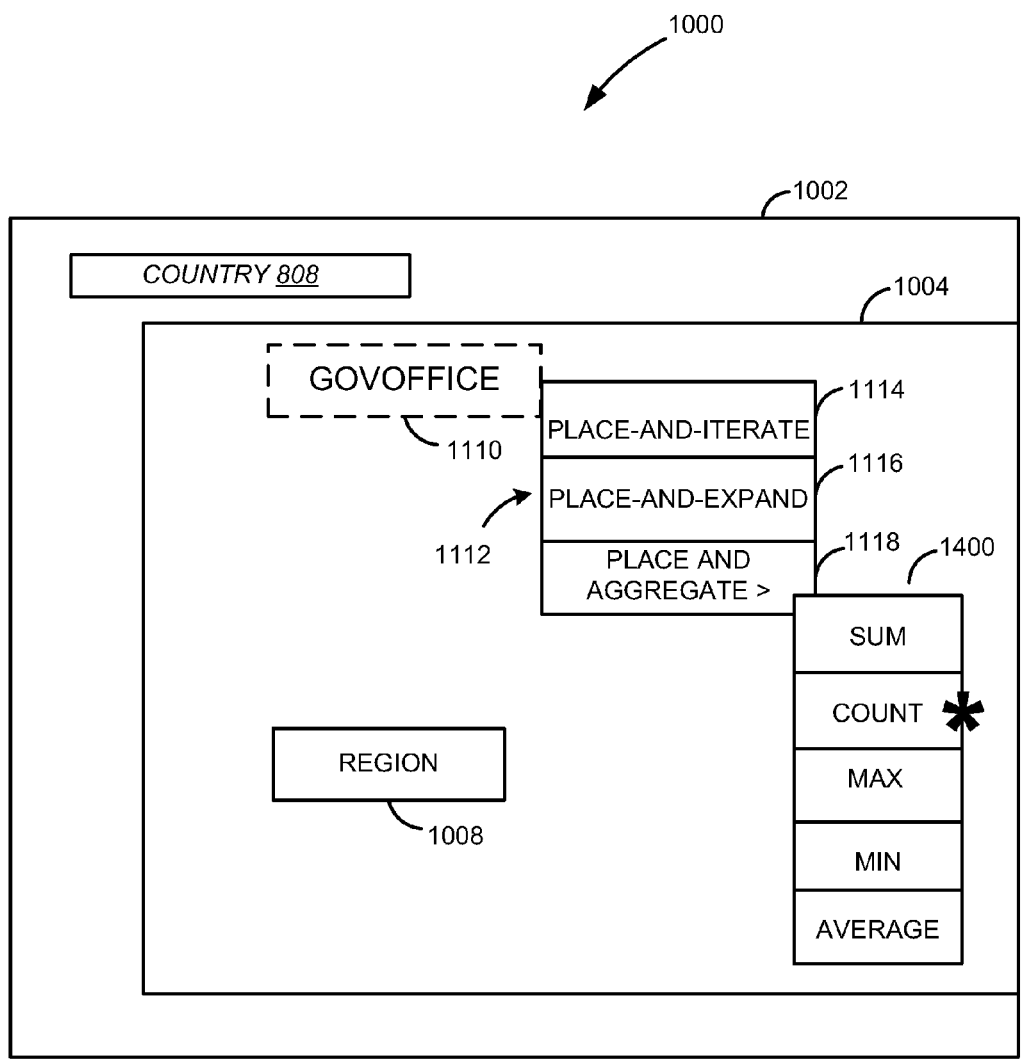
FIG. 14A illustrates a set of aggregation options for placing the new report object in the report of FIG. 11A when the selected placement option is "place-and-aggregate", according to an embodiment.

FIG. 14A illustrates the report 1000 of FIG. 11A when the selected placement option is a "place-and-aggregate" 1118 in FIG. 11B, according to an embodiment. As shown in FIG. 14A a set of aggregation options 1400 are presented to when the "place-and-aggregate" 1118 is selected (block 602, FIG. 6). The set of aggregation options 1400 include a Sum option (sum of all data elements in the report object), a maximum value (Max) option (refers to the data element of the new report object having the maximum value), a Count option (count of the data elements in the new report object), a minimum value (Min) option (refers to the data element of the new report object having the minimum value), and an Average option (refers to the average of all data elements contained in the new report object). In one embodiment, the set of aggregation options 1400 are presented to the user on a user interface. In one embodiment, the user selects one of the aggregation options from the set of aggregation options 1400 presented to the user through the user interface. In the present embodiment, the user selects the aggregation option (Count), from the set of aggregation options 1400, for the new report object 1110 "GovOffice."

Next, an aggregation value "Count of GovOffice" is calculated for the data elements (Water, Agriculture, Water, Water, Water, and Agriculture) of the new report object 1110 "GovOffice" based on the selected aggregation option (Count) (block 604, FIG. 6). As shown in FIG. 11A, the received requested is to place the new report object 1110 "GovOffice" in the sub-area 1004 of the report 1000. The sub-area 1004 includes an existing report object 1008 "Region". The "Count of GovOffice" is calculated for each data element of the existing report object 1008 "Region". As shown in FIG. 13B, the first data element BC of the existing report object 1008 "Region" has two corresponding data elements (Water, Agriculture) in the new report object 1110 "GovOffice." Therefore, the "Count of GovOffice" 1 for the data element BC is 2. Similarly, the data element ON (existing report object 1008 "Region") has one corresponding data element Water (new report object 1110 "GovOffice") therefore the "Count of GovOffice" for data element BC is 1. The data element IdF (existing report object 1008 "Region") has one corresponding data element Water (new Report Object 1110 "GovOffice"), therefore the "Count of GovOffice" for the data element IdF is 1. The data element BW of the existing report object 1008 "Region" has two corresponding data elements (Water, Agriculture) in the new report object 1110 "GovOffice," and therefore the "Count of GovOffice" for the data element BW is 2. Based on the above calculations the aggregation value "Count of GovOffice" has data elements (2, 1, 1, and 2).

Figure 14B:
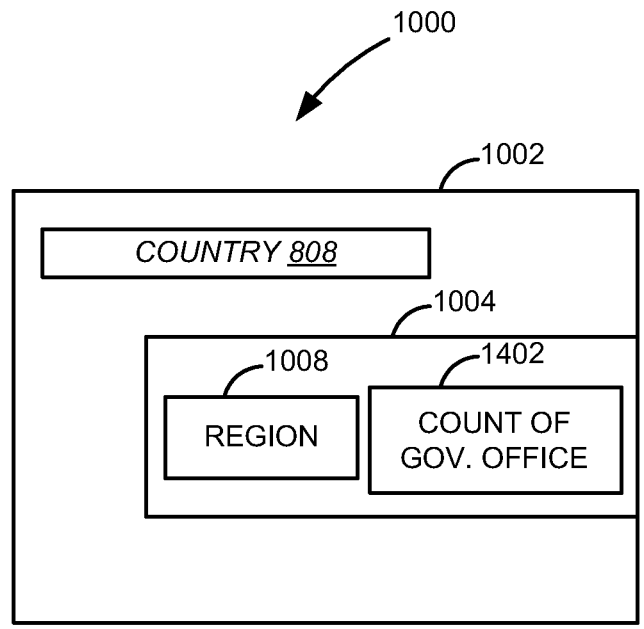
FIG. 14B illustrates an aggregation value of the new report object placed in the report of FIG. 11A when one of the aggregation option is selected from the set of aggregation options of FIG. 14A, according to an embodiment.

FIG. 14B illustrates the report 1000 of FIG. 11A when the one of the aggregation option is selected from the set of aggregation options 1400 of FIG. 14A, according to an embodiment. As shown in FIG. 14B the calculated aggregation value ("Count of GovOffice" 1402) is placed in the area (sub-area 1004) requested (block 606, FIG. 6). As shown, in the present embodiment the "Count of GovOffice" 1402 (which has data elements (2, 1, 1, and 2) obtained from the calculation) are placed in the sub-area 1004 along with the existing report object 1008 "Region" (block 606, FIG. 6).

Figure 14C:
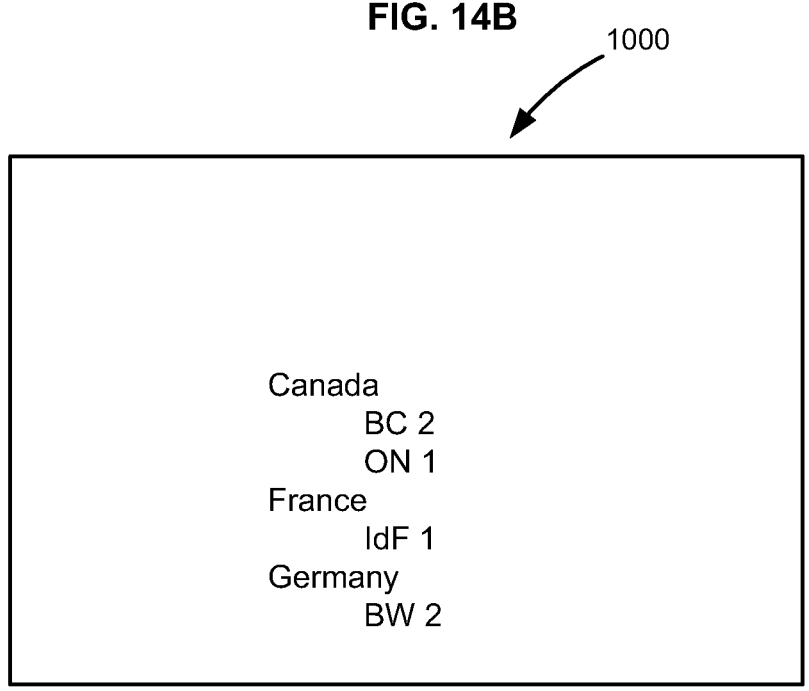
FIG. 14C illustrates the rendering of the report of FIG. 11A when the selected placement option is "place-and-aggregate", according to an embodiment.

Finally, the data elements included in the existing report objects (existing report object 808 "Country" and existing report object 1008 "Region") and the calculated aggregation value ("Count of GovOffice" 1402) is rendered (block 608, FIG. 6). The report 1000 is rendered based on the iteration key of the area 1002 and the iteration key of the sub-area 1004. FIG. 14C illustrates rendering of the report 1000 of FIG. 14B, according to an embodiment. As shown in FIG. 14C, initially the first data element Canada of the existing report object 808 "Country" is rendered. Next, the data elements of the existing report object 1008 "Region" corresponding to the data element Canada (existing report object 808 "Country") are rendered along with the corresponding data elements of "Count of GovOffice" 1402. As shown, the data element BC (existing report object 1008 "Region") is rendered along with the corresponding data element 2 ("Count of GovOffice" 1402). Next, the data element ON (existing report object 1008 "Region") is rendered along with the corresponding data element 1 ("Count of GovOffice" 1402).

Next, the second data element France (existing report object 808 "Country") is rendered followed by the rendering of the data elements of the existing report object 1008 "Region" corresponding to the data element France. As shown, the data element IdF (existing report object 1008 "Region") is rendered along with the corresponding data element 1 ("Count of GovOffice" 1402").

Finally, the last data element Germany (existing report object 808 "Country") is rendered followed by the rendering of the data element BW (existing report object 1008 "Region") and the corresponding data element 2 ("Count of GovOffice" 1402).

Figure 15A:
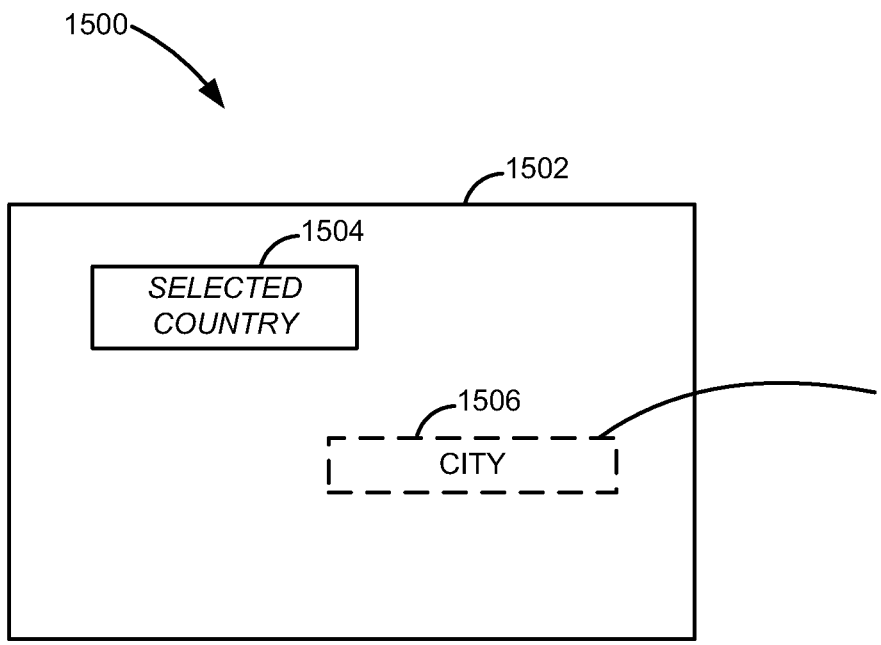
FIG. 15A illustrates an exemplary report that receives a request to place a new report object, according to another embodiment.

FIG. 15A illustrates an exemplary report 1500, according to another embodiment. The report 1500 includes an area 1502 that has an existing report object 1504 "Selected Country". The existing report object 1504 "Selected Country" has a single data element Canada. A request is received to place a new report object 1506 "City" in the area 1502 of the report 1500. The new report object 1506 "City" has data elements (Victoria, Vancouver, Ottawa, Toronto, and Montreal). The area type of the area 1502 is static type.

Figure 15B:
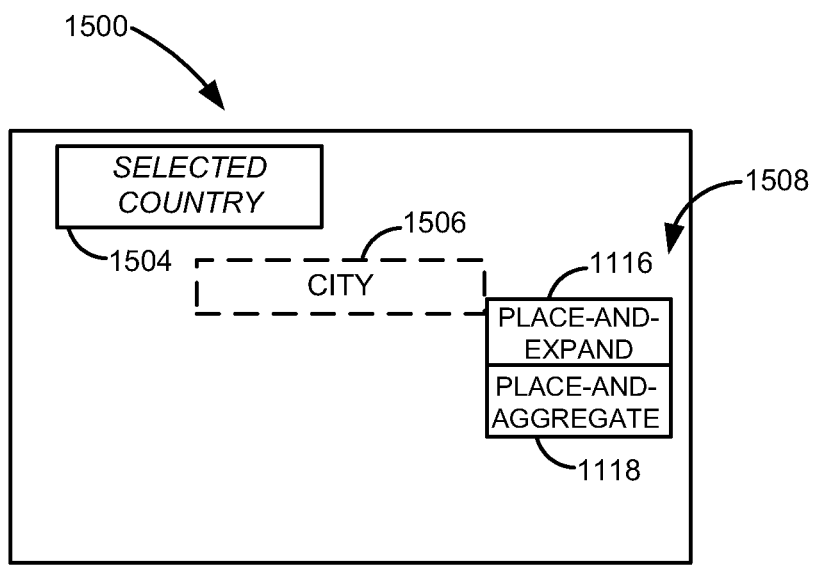
FIG. 15B illustrates a set of placement options for placing the new report object in the report of FIG. 15A, according to an embodiment.

FIG. 15B illustrates a set of placement options 1508 presented for placing the new report object 1506 "City" in the report of FIG. 15A. In one embodiment, the set of placement options 1508 are presented to a user. As the area type of the area in which the new report object 1506 "City" is requested to be placed is static, the set of placement options 1508 provided includes "place-and-expand" 1116, and "place-and-aggregate" 1118 (block 302 and block 304, FIG. 3).

Figure 16A:
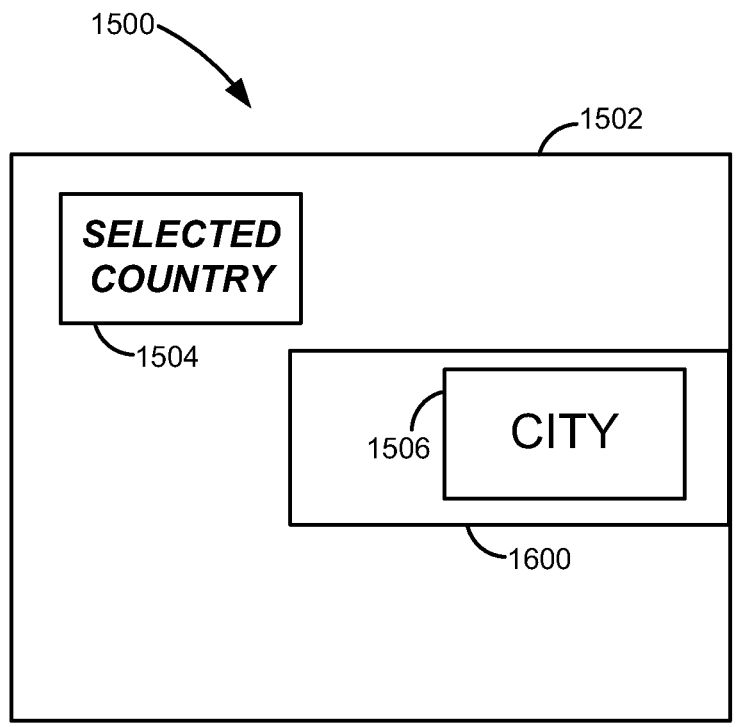
FIG. 16A illustrates the report of FIG. 15A when the selected placement option is "place-and-expand", according to an embodiment.

FIG. 16A illustrates the report of FIG. 15A when the selected placement option is "place-and-expand" 1116 is selected in FIG. 15B, according to an embodiment. Initially, a sub-area 1600 is created in the area 1502 where the new report object 1506 "City" is requested to be placed. The sub-area 1600 has an iteration key, which is empty when the sub-area 1600 is created. Next, the new report object 1506 "City" is added to the iteration key of the sub-area 1600 (block 502, FIG. 5). The iteration key of the sub-area 1600 therefore includes the new report object 1506 "City". Next, as shown the new report object 1506 "City" is placed in the sub-area 1600 (block 504, FIG. 5).

Finally, the report 1500 is rendered based on the iteration key of the sub-area 1600 (block 506, FIG. 5). The iteration key of the sub-area 1600 defines the sequence in which the data elements of the new report object 1506 "City" are rendered. The iteration key of the sub-area 1600 includes the new report object 1506 "City." The data element Canada (existing report object 1504 "Selected Country") is rendered once followed by the rendering of each of the data elements of the new report object 1506 "City".

Figure 16B:
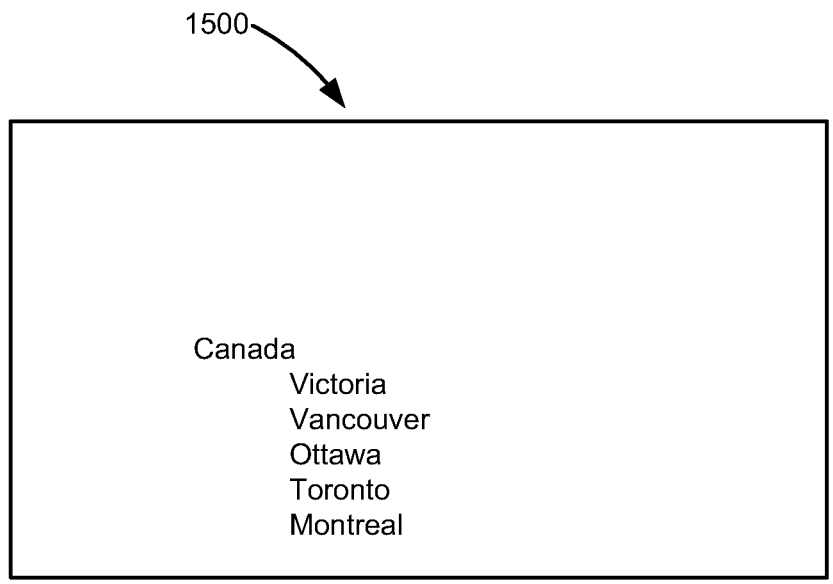
FIG. 16B illustrates the rendering of the report of FIG. 15A when the selected placement option is "place-and-expand", according to an embodiment.

FIG. 16B illustrates the rendering of the report 1500 when the selected option is "place-and-expand" 1116, according to an embodiment. As shown, initially the data element Canada (existing report object 1504 "Selected Country") is rendered. Next each of the data elements of the new report object 1506 "City" is rendered. As shown, after the data element Canada (existing report object 1504 "Selected Country") has been rendered the first data element Victoria (new report object 1506 "City") is rendered, next the second data element Vancouver (new report object 1506 "City") is rendered, next the third data element Ottawa (new report object 1506 "City") is rendered, next the fourth data element Toronto (new report object 1506 "City") is rendered, and finally the last data element Montreal (new report object 1506 "City") is rendered.

Figure 17A:
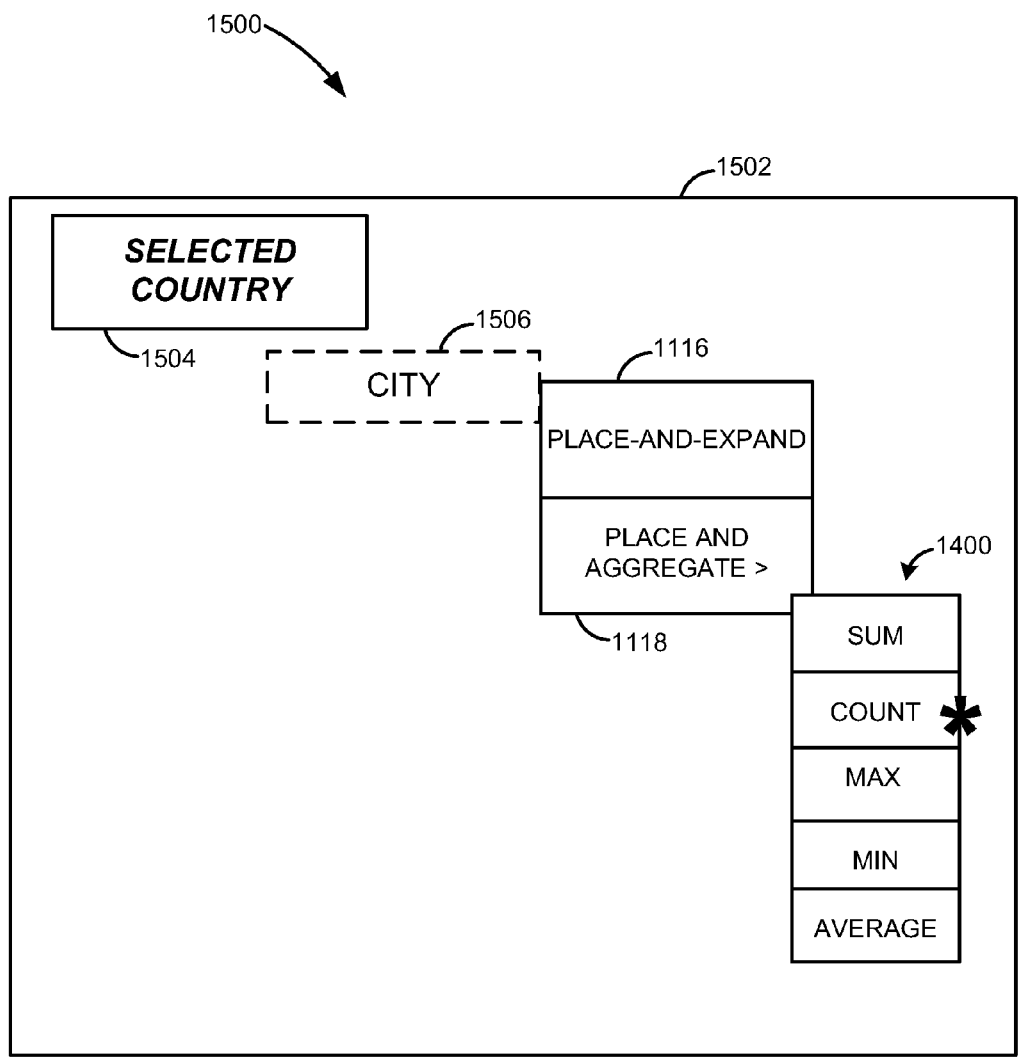
FIG. 17A illustrates a set of aggregation options for placing the new report object in the report of FIG. 15A, according to an embodiment.

FIG. 17A illustrates the report 1500 of FIG. 15A when the selected placement option is the "place-and-aggregate" 1118, according to an embodiment. As shown in FIG. 17A, initially a set of aggregation options 1400 are presented (block 602, FIG. 6). The set of aggregation options 1400 include a Sum option (sum of all data elements in the new report object), a maximum value (Max) option (refers to the data element of the new report object having the maximum value), a Count option (count of the data elements in the new report object), a minimum value (Min) option (refers to the data element of the new report object having the minimum value), and an Average option (refers to the average of all data elements contained in the new report object). In one embodiment, the user selects one of the aggregation options from the set of aggregation options 1400. In the present embodiment, the user selects the aggregation option (Count) for placing the new report object 1506 "City" in the area 1502 of the report 1500.

Next, an aggregation value ("Count of City") is calculated for the data elements (Victoria, Vancouver, Ottawa, Toronto, and Montreal) of the new report object 1506 "City" based on a selected aggregation option (Count) (block 504, FIG. 5). As there are five data elements in the new report object 1506 "City", the "Count of City" is 5.

Figure 17B:
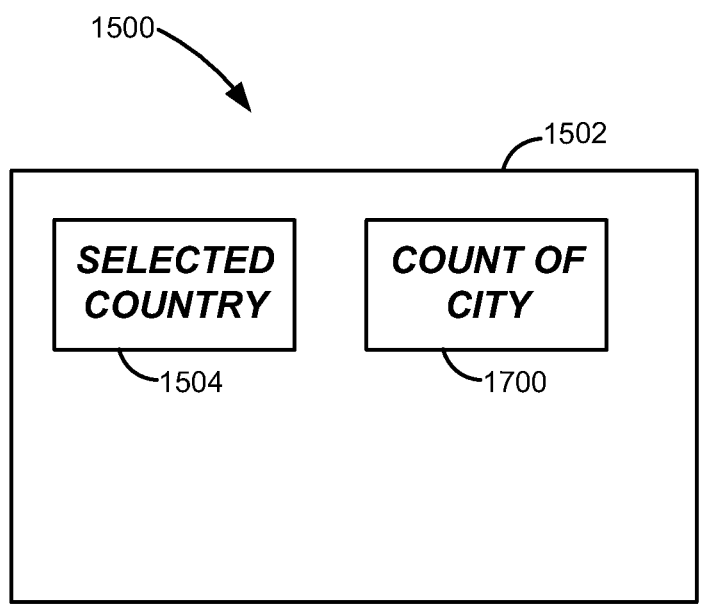
FIG. 17B illustrates an aggregation value of the new report object placed in the report of FIG. 15A when the selected placement option is "place-and-iterate", according to an embodiment.

Next, the calculated aggregation value ("Count of City") is placed in the area 1502 (block 606, FIG. 6). FIG. 17B illustrates the report 1500 of FIG. 17A when a placement option is selected from the set of placement options 1400, according to an embodiment. As shown in FIG. 17B the aggregation value 1700 "Count of City" that has data element (5) is placed in the area 1502 along with the existing report object 1504 "Selected Country".

Figure 17C:
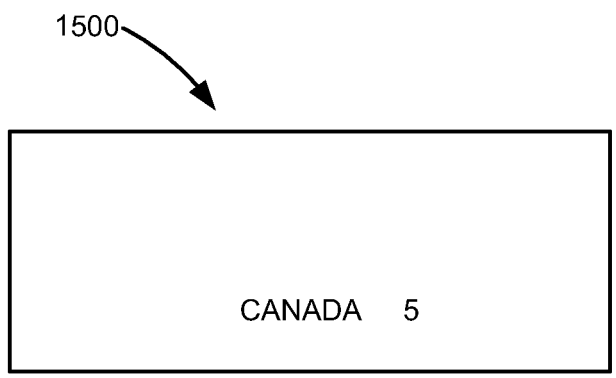
FIG. 17C illustrates the rendering of the report of FIG. 15A when the selected placement option is "place-and-expand", according to an embodiment.

Finally, the data element (Canada) of the existing report object 1504 "Selected Country" and the aggregation value 1700 ("Count of City") are rendered (block 608, FIG. 6). FIG. 17C illustrates rendering of the report 1500 when the selected placement option is "place-and-aggregate" 1118, according to an embodiment. As shown in FIG. 17C, the data element Canada (existing Report Object 1504 "Selected Country") is rendered along with the aggregation value 5 ("Count of City" 1700).

Figure 18:
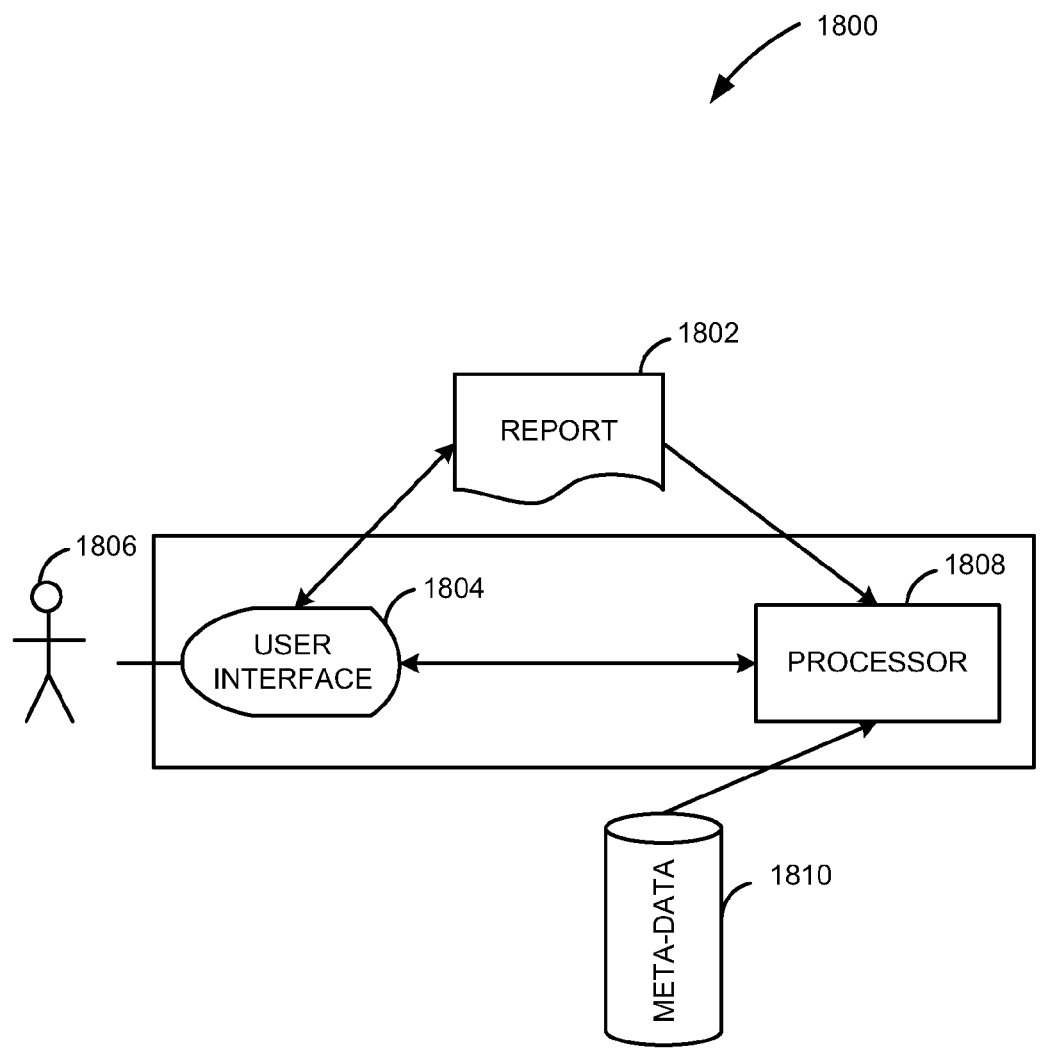
FIG. 18 illustrates a block diagram of a system for providing a set of placement options when a new report object is requested to be placed in an area of a report, according to an embodiment.

FIG. 18 is a block diagram of an exemplary system 1800 for providing a set of placement options when a new report object is requested to be placed in an area of a report 1802, according to an embodiment. The system 1800 includes a user interface 1804 that displays the report 1802. In one embodiment, the report 1802 may include one or more areas. In one embodiment, the one or more areas of the report may include one or more existing report objects. A user 1806 requests through the user interface 1804 for placing a new report object in an area of the report 1802. A processor 1808 is invoked when the user interface 1804 receives the request for placing the new report object in the area of the report 1802.

The system includes a memory 1810 for storing a metadata. The metadata includes a semantic relationship between all the existing report objects and between the new report object and each of the existing report objects. The semantic relationship between all the existing report objects and each of the one or more existing report objects is either a one-to-one relationship or a one-to-many relationship.

The report 1802 includes a current state of the report 1802. The current state of the report 1802 includes information of the area where the new report object is requested to be placed. The information of the area includes the information about the one or more existing report objects associated with the area. In case the area where the new report object is being placed is a sub-area present within an area, the information about the area includes information about all the report objects associated with the sub-area and all the report objects associated with the area of the sub-area. The current state of the report 1802 also includes information about the area type of the area in which the new report object is requested to be placed.

The processor 1808 then queries the metadata to obtain the semantic relationship between the new report object and each of the existing report objects associated with the area in which the new report object is requested to be placed. The processor 1808 then determines a set of placement options based on at least one of the following: the semantic relationship between the new report object and each of the existing report object, and the area type of the area where the next report object is requested to be placed.

The processor 1808 determines the set of placement options as "place-as-is" when the area type of the area is the iterative type and the semantic relationship between the new report object and each of the existing report objects is one-to-one. The processor 1808 determines the set of placement options as "place-and-iterate", "place-and-aggregate", and "place-and-expand" when the area type of the area is iterative type and the semantic relationship between the new report object and any one of the existing report objects is one-to-many. The processor 1808 determines the set of placement options as "place-and-aggregate" and "place-and-expand" when the area type is static.

The user interface 1804 provides the set of placement options determined by the processor 1808 to the user 1806. In one embodiment, the user 1806 selects one of the placement options from the set of placement options displayed on the user interface 1804. The processor 1808 finally renders the report 1802 based on the user selected placement option from the set of placement options.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 19:
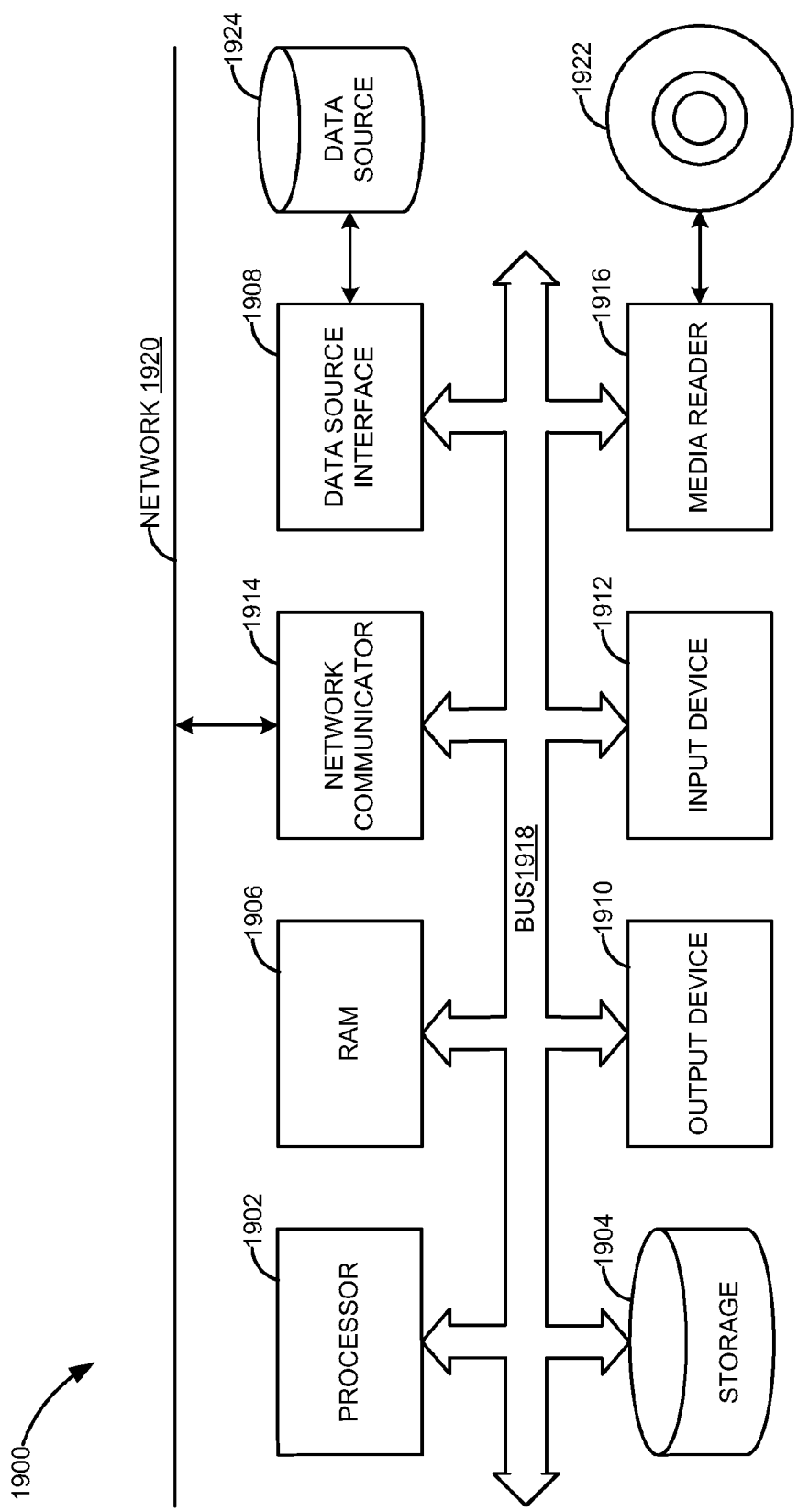
FIG. 19 is a block diagram illustrating a computing environment in which the techniques described for providing the set of placement options can be implemented, according to an embodiment.

FIG. 19 is a block diagram of an exemplary computer system 1900. The computer system 1900 includes a processor 1902 that executes software instructions or code stored on a computer readable storage medium 1922 to perform the above-illustrated methods of the invention. The computer system 1900 includes a media reader 1916 to read the instructions from the computer readable storage medium 1922 and store the instructions in storage 1904 or in random access memory (RAM) 1906. The storage 1904 provides a large space for keeping static data where at least some instructions could be stored for later execution. The stored instructions may be further compiled to generate other representations of the instructions and dynamically stored in the RAM 1806. The processor 1902 reads instructions from the RAM 1906 and performs actions as instructed. According to one embodiment of the invention, the computer system 1900 further includes an output device 1910 (e.g., a display) to provide at least some of the results of the execution as output including, but not limited to, visual information to users and an input device 1912 to provide a user or another device with means for entering data and/or otherwise interact with the computer system 1900. Each of these output devices 1910 and input devices 1912 could be joined by one or more additional peripherals to further expand the capabilities of the computer system 1900. A network communicator 1914 may be provided to connect the computer system 1900 to a network 1920 and in turn to other devices connected to the network 1920 including other clients, servers, data stores, and interfaces, for instance. The modules of the computer system 1900 are interconnected via a bus 1918. Computer system 1900 includes a data source interface 1908 to access data source 1924. The data source 1924 can be accessed via one or more abstraction layers implemented in hardware or software. For example, the data source 1924 may be accessed by network 1920. In some embodiments the data source 1924 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A method for providing a set of placement options when a new report object is requested to be placed in an area of a report, the method comprising:
    receiving a request to place the new report object in the area of the report;
    determining the set of placement options based on at least one of the following: an area type, and a semantic relationship between the new report object and one or more existing report objects associated with the area; and
    providing the set of placement options based on the determination, wherein the area type of the area is one of an iterative type and a static type, and wherein the area having the area type as the iterative type has an iteration key, the iteration key storing the one or more existing report objects associated with the area, and wherein when the area type is the iterative type and the semantic relationship between the new report object and the one or more existing report objects is one-to-one, providing a place-as-is placement option, and when the place-as-is placement option is selected:
    determining whether the iteration key of the area is empty;
    adding the new report object to the iteration key when the iteration key of the area is empty;
    placing the new report object in the area; and
    rendering one or more data elements associated with the one or more existing report objects and the new report object based on the iteration key, the iteration key defining a sequence in which the one or more data elements are rendered, and wherein when the area type is the iterative type and the semantic relationship between the new report object and the one or more existing report objects is one-to-many, providing one of: a place-and-iterate placement option, a place-and-aggregate placement option, and a place-and-expand placement option, and when the place-and-iterate placement option is selected:
    adding the new report object to the iteration key of the area;
    placing the new report object in the area; and
    rendering the one or more data elements associated with the one or more existing report objects and the new report object based on the iteration key, and wherein when the place-and-aggregate placement option is selected:
    presenting a set of aggregation options;
    calculating an aggregation value for the one or more data elements associated with the new report object based on an aggregation option selected from the set of aggregation options;
    placing the aggregation value in the area; and rendering the one or more data elements associated with the one or more existing report objects and the aggregation value, and wherein when the place-and-expand placement option is selected the method further comprising:
  creating a sub-area in the area, the sub-area having an iteration key;
  adding the new report object to the iteration key of the sub-area;
  placing the new report object in the sub-area; and
  rendering the one or more data elements associated with the one or more existing report objects and the new report object based on the iteration key of the area and the iteration key of the sub-area, the iteration key of the area and the iteration key of the sub-area defining a sequence in which the one or more data elements are rendered.

2. The method according to claim 1, further comprising:
  obtaining the semantic relationship between the new report object and the one or more existing report objects, wherein the semantic relationship is obtained based on following operations:
    retrieving a current state of the report and a metadata associated with the one or more existing report objects associated with the area and the new report object, the current state of the report including an information of the area, the information including an information of the one or more existing report objects associated with the area and the area type, the metadata including the semantic relationship between the one or more existing report objects and between the new report object and the one or more existing report objects;
    storing the one or more existing report objects in a data hull; and
    querying the metadata to obtain the semantic relationship between the new report object and the one or more existing report objects stored in the data hull.

3. The method according to claim 1, wherein when the area type is the static type, providing the place-and-aggregate placement option, and when the place-and-aggregate placement option is selected, the method further comprising:
  presenting the set of aggregation options;
  calculating the aggregation value for the one or more data elements of the new report object based on an aggregation option selected from the set of aggregation options;
  placing the aggregation value in the area; and
  rendering the one or more data elements associated with the one or more existing report objects and the aggregation value.

4. The method according to claim 1, wherein when the area type is the static type, providing the place-and-expand option, and when the place-and-expand placement option is selected, the method further comprising:
  creating the sub-area in the area, the sub-area having the iteration key;
  adding the new report object to the iteration key of the sub-area;
  placing the new report object in the sub-area; and
  rendering the one or more data elements associated with the one or more existing report objects and the new report object, the one or more data elements of the new report object being rendered based on the iteration key.

5. The method according to claim 2, wherein the area of the report has the sub-area, the sub-area having one or more existing report objects, the data hull of the sub-area storing the one or more existing report objects associated with the sub-area and the one or more existing report objects associated with the area.

6. A non-transitory computer readable storage medium to tangibly store instructions, which when executed by a computer, cause the computer to:
  receive a request to place the new report object in the area of the report;
  determine the set of placement options based on at least one of the following: an area type, and a semantic relationship between the new report object and one or more existing report objects associated with the area; and
  provide the set of placement options based on the determination, wherein the area type of the area is one of an iterative type and a static type, and wherein the area having the area type as the iterative type has an iteration key, the iteration key storing the one or more existing report objects associated with the area, and wherein when the area type is the iterative type and the semantic relationship between the new report object and the one or more existing report objects is one-to-one, providing a place-as-is placement option, and when the place-as-is placement option is selected, the method further comprising:
  determine whether the iteration key of the area is empty;
  add the new report object to the iteration key when the iteration key of the area is empty;
  place the new report object in the area; and
  render one or more data elements associated with the one or more existing report objects and the new report object based on the iteration key, the iteration key defining a sequence in which the one or more data elements are rendered, and wherein when the area type is the iterative type and the semantic relationship between the new report object and the one or more existing report objects is one-to-many, providing one of: a place-and-iterate placement option, a place-and-aggregate placement option, and a place-and-expand placement option, and when the place-and-iterate placement option is selected:
  add the new report object to the iteration key of the area;
  place the new report object in the area; and
  render the one or more data elements associated with the one or more existing report objects and the new report object based on the iteration key, and wherein when the place-and-aggregate placement option is selected:
  present a set of aggregation options;
  calculate an aggregation value for the one or more data elements associated with the new report object based on an aggregation option selected from the set of aggregation options;
  place the aggregation value in the area; and
  render the one or more data elements associated with the one or more existing report objects and the aggregation value, and wherein when the place-and-expand placement option is selected the method further comprising:
  create a sub-area in the area, the sub-area having an iteration key;
  add the new report object to the iteration key of the sub-area;
  place the new report object in the sub-area; and
  render the one or more data elements associated with the one or more existing report objects and the new report object based on the iteration key of the area and the iteration key of the sub-area, the iteration key of the area and the iteration key of the sub-area defining a sequence in which the one or more data elements are rendered.

7. The article of manufacture non-transitory computer readable storage medium according to claim 6, further comprising instructions to obtain the semantic relationship which when executed by the computer further causes the computer to:
retrieve a current state of the report and a metadata associated with the one or more existing report objects associated with the area and the new report object, the current state of the report including an information of the area, the information including an information of the one or more existing report objects associated with the area and the area type, the metadata including a semantic relationship between the one or more existing report objects and between the new report object and the one or more existing report objects;
store the one or more existing report objects in a data hull; and
query the metadata to obtain the semantic relationship between the new report object and the one or more existing report objects stored in the data hull.

8. The non-transitory computer readable storage medium according to claim 6, wherein when the area type is the static type, provide the place-and-aggregate placement option, and when the place-and-aggregate placement option is selected, the article of manufacture further comprising instructions which when executed by the computer further causes the computer to:
present the set of aggregation option;
calculate the aggregation value for the one or more data elements of the new report object based on an aggregation option selected from the set of aggregation options;
place the aggregation value in the area; and
render the one or more data elements associated with the one or more existing report objects and the aggregation value.

9. The non-transitory computer readable storage medium according to claim 6, wherein when the area type is the static type, provide the place-and-expand placement option, and when the place-and-expand placement option is selected, the article of manufacture further comprising instructions which when executed by the computer further causes the computer to:
create the sub-area in the area, the sub-area having an iteration key;
add the new report object to the iteration key of the sub-area;
place the new report object in the sub-area; and
render the one or more data elements associated with the one or more existing report objects and the new report object, the one or more data elements of the new report object being rendered based on the iteration key.

10. The non-transitory computer readable storage medium according to claim 7, wherein the area of the report has the sub-area, the sub-area having one or more existing report objects, the data hull of the sub-area storing the one or more existing report objects associated with the sub-area and the one or more existing report objects associated with the area.

11. A computer system for providing a set of placement options when a new report object is requested to be placed in an area of a report, the computer system comprising:
a memory to store a program code;
a processor communicatively coupled to the memory, the processor configured to execute the program code to:
receive a request to place the new report object in the area on a user interface;
determine the set of placement options based on at least one of the following: an area type, and a semantic relationship between the new report object and one or more existing report objects associated with the area; and
provide the set of placement options based on the determination, wherein the area type of the area is one of an iterative type and a static type, and wherein the area having the area type as the iterative type has an iteration key, the iteration key storing one or more existing report objects associated with the area, and wherein when the area type is the iterative type and the semantic relationship between the new report object and the one or more existing report objects is one-to-one, providing a place-as-is placement option, and when the place-as-is placement option is selected, the method further comprising:
determine whether the iteration key of the area is empty;
add the new report object to the iteration key if the iteration key of the area is empty;
placing the new report object in the area; and
render one or more data elements associated with the one or more existing report objects and the new report object based on the iteration key, the iteration key defining a sequence in which the one or more data elements are rendered, and wherein when the area type is the iterative type and the semantic relationship between the new report object and the one or more existing report objects is one-to-many, providing one of: a place-and-iterate placement option, a place-and-aggregate placement option, and a place-and-expand placement option, and when the place-and-iterate placement option is selected:
add the new report object to the iteration key of the area;
place the new report object in the area; and
render the one or more data elements associated with the one or more existing report objects and the new report object based on the iteration key, and wherein when the place-and-aggregate placement option is selected:
present a set of aggregation options;
calculate an aggregation value for the one or more data elements associated with the new report object based on an aggregation option selected from the set of aggregation options;
place the aggregation value in the area; and
render the one or more data elements associated with the one or more existing report objects and the aggregation value, and wherein when the place-and-expand placement option is selected the method further comprising:
create a sub-area in the area, the sub-area having an iteration key;
add the new report object to the iteration key of the sub-area;
place the new report object in the sub-area; and
render the one or more data elements associated with the one or more existing report objects and the new report object based on the iteration key of the area and the iteration key of the sub-area, the iteration key of the area and the iteration key of the sub-area defining a sequence in which the one or more data elements are rendered.

12. The computer system according to claim 11, wherein the processor further executes the program code to obtain the semantic relationship based on the following:

retrieve a current state of the report from the report and a metadata associated with the one or more existing report objects from the memory, the current state of the report including an information of the area, the information including an information of the one or more existing report objects associated with the area and the area type, the metadata including a semantic relationship between the one or more existing report objects and between the new report object and the one or more existing report objects;

store the one or more existing report objects in a data hull; and query the metadata to obtain the semantic relationship between the new report object and each of the one or more existing report objects stored in the data hull.

13. The computer system according to claim 11, wherein when the area type is the static type, provide a place-and-aggregate placement option on the user interface, and when the place-and-aggregate placement option is selected, the processor further executes the program code to:

present the set of aggregation options on the user interface;

calculate the aggregation value for the one or more data elements of the new report object based on an aggregation option selected from the set of aggregation options presented on the user interface;

place the aggregation value in the area; and render the one or more data elements associated with the one or more existing report objects and the aggregation value.

14. The computer system according to claim 11, wherein when the area type is the static type, provide a place-and-expand placement option on the user interface, and when the place-and-expand placement option is selected on the user interface, the processor further executes the program code to:

create the sub-area in the area, the sub-area having an iteration key;

add the new report object to the iteration key of the sub-area;

place the new report object in the sub-area; and render the one or more data elements associated with the one or more existing report objects and the new report object, the one or more data elements of the new report object being rendered based on the iteration key.

15. The computer system according to claim 12, wherein the area of the report has the sub-area, the sub-area having one or more existing report objects, the data hull of the sub-area storing the one or more existing report objects associated with the sub-area and the one or more existing report objects associated with the area.

\* \* \* \* \*